US010728525B2

(12) United States Patent
Azuma et al.

(10) Patent No.: US 10,728,525 B2
(45) Date of Patent: Jul. 28, 2020

(54) IMAGE CAPTURING APPARATUS, IMAGE PROCESSING METHOD, AND RECORDING MEDIUM

(71) Applicant: Panasonic Intellectual Property Management Co., Ltd., Osaka (JP)

(72) Inventors: Takeo Azuma, Kyoto (JP); Nobuhiko Wakai, Osaka (JP); Kunio Nobori, Osaka (JP); Satoshi Sato, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 82 days.

(21) Appl. No.: 15/960,983

(22) Filed: Apr. 24, 2018

(65) Prior Publication Data

US 2018/0316907 A1    Nov. 1, 2018

(30) Foreign Application Priority Data

Apr. 28, 2017   (JP) ................................ 2017-090043

(51) Int. Cl.
*H04N 13/239*        (2018.01)
*H04N 13/243*        (2018.01)
(Continued)

(52) U.S. Cl.
CPC ......... *H04N 13/271* (2018.05); *H04N 13/239* (2018.05); *H04N 13/243* (2018.05); *H04N 2013/0081* (2013.01)

(58) Field of Classification Search
CPC ............... H04N 13/243; H04N 13/271; H04N 2013/0081; H04N 13/239
See application file for complete search history.

(56) References Cited

U.S. PATENT DOCUMENTS 5,475,422 A  * 12/1995  Mori ...................... G06K 9/209
                                                         348/48
2003/0012409 A1 *  1/2003  Overton .................... G06T 7/60
                                                         382/103
(Continued)

FOREIGN PATENT DOCUMENTS

JP       2008-096162      4/2008
JP       2015-133691      7/2015

OTHER PUBLICATIONS

Takashi Matsuyama et al., "Computer Vision", New Technology communications, Jun. 15, 1998, pp. 123-137 (Partial Translation).

(Continued)

*Primary Examiner* — Anner N Holder
(74) *Attorney, Agent, or Firm* — Wenderoth, Lind & Ponack, L.L.P.

(57) ABSTRACT

An image capturing apparatus: calculates, for each of pairs of images, based on the pairs of images and camera parameters, position information including information specifying a three-dimensional position of a measurement point with respect to a pair of pixels respectively included in the pair of images, and information specifying a position of each of the pair of pixels; performs, based on the position information and the camera parameters, weighted addition on the information specifying the three-dimensional position of the measurement point in each of the pair of images, with information using an effective baseline length or a viewing angle, with respect to the three-dimensional position, of a pair of the cameras corresponding to the pair of images; and outputs position information of the measurement point to which a weighted addition value is applied.

9 Claims, 17 Drawing Sheets

(51) Int. Cl.
*H04N 13/271* (2018.01)
*H04N 13/00* (2018.01)

(56) References Cited

U.S. PATENT DOCUMENTS

| | | | |
|---|---|---|---|
| 2008/0049100 A1* | 2/2008 | Lipton | H04N 13/144 348/43 |
| 2009/0160934 A1* | 6/2009 | Hendrickson | G03B 35/08 348/47 |
| 2015/0172633 A1 | 6/2015 | Nobori et al. | |

OTHER PUBLICATIONS

Manuel Werlberger et al., "Motion estimation with non-local total variation regularization", IEEE Conference on Computer Vision and Pattern Recognition (CVPR), Jun. 2010, pp. 2464-2471.

C. Zach et al., "A duality based approach for realtime TV-L1 optical flow", In Proceedings of the 29th DAGM conference on Pattern recognition, 2007, pp. 214-223.

\* cited by examiner

FRAME 1 (OBJECT DISTANCE IS ONE METER APPROXIMATELY)

FRAME 2

FRAME 3

FRAME 4

FRAME 5

FRAME 6

| METHOD | RELATIVE RMS ERROR |
|---|---|
| STEREO DISTANCE MEASUREMENT (101a-101b) | 4.46% |
| STEREO DISTANCE MEASUREMENT (101a-101c) | 18.84% |
| STEREO DISTANCE MEASUREMENT (101a-101d) | 11.21% |
| WEIGHTED AVERAGE WITH VIEWING-ANGLE CORRESPONDING LENGTH TO THE MINUS TWO (EMBODIMENT) | 4.45% |
| WEIGHTED AVERAGE WITH DISPARITY MAGNITUDE (PATENT LITERATURE 1) | 5.65% |
| WEIGHTED HARMONIC AVERAGE WITH DISTANCE TO THE MINUS ONE (PATENT LITERATURE 2) | 4.63% |

IMAGE CAPTURING APPARATUS, IMAGE PROCESSING METHOD, AND RECORDING MEDIUM

BACKGROUND

1. Technical Field

The present disclosure relates to an image capturing apparatus, an image processing method, and a recording medium.

2. Description of the Related Art

For example, Japanese Unexamined Patent Application Publication No. 2015-133691 (Patent Literature 1) and Japanese Patent No. 5011528 (Patent Literature 2) disclose known technologies of positioning a target object by using an image capturing apparatus including a fish-eye lens. The positioning using a fish-eye lens has such an advantage that depth measurement can be performed in a wide range. However, a fish-eye lens has a wide angle of view of 180° approximately or larger, and thus another camera may be visible in a field of view of a camera. More precisely, a lens center or optical center of another camera is in the field of view of a camera. The lens center or the optical center is a point called an epipole in stereoscopic depth measurement. When viewed in a camera of interest, disparity is constant irrespective of depth on a line passing through the epipole, and thus stereoscopic depth measurement cannot be performed. In a direction not completely aligned with the epipole but close to the epipole, the amount of change in disparity is small with depth change, which leads to decreases of the accuracy in depth measurement.

Stereoscopic depth measurement at the above-described epipole cannot be performed with a two-fish-eye camera including two image capturing apparatuses. However, in a case of a three-or-more fish-eye camera including three or more image capturing apparatuses, stereo pairs each including a pair of cameras can be selected. Thus, when stereoscopic depth measurement cannot be performed with a stereo pair due to the epipole, stereoscopic depth measurement can be performed with another stereo pair. For example, pairs of cameras with which stereoscopic depth measurement is performed can be combined in $_3C_2=3$ ways for a three-eye camera, and in $_4C_2=6$ ways for a four-eye camera. Among these combinations, the number of combinations of camera pairs including a camera of interest as a reference is two for a three-eye camera and three for a four-eye camera. When stereoscopic depth measurement is performed plural times, the epipole differs between the measurements because, while the reference camera is same, the other cameras are different. Thus, the three-dimensional position of a measurement point at which stereoscopic depth measurement cannot be performed with one camera pair due to the epipole, and the three-dimensional position of a measurement point close to the epipole for which the accuracy of depth measurement is unlikely to be obtained can be acquired by stereoscopic depth measurement with another camera pair.

A highly accurate depth measurement value can be obtained through selection of a depth measurement value with highest accuracy or integration of depth measurement values among stereoscopic depth measurement values of a multi-fish-eye camera as described above. A method in Patent Literature 1 obtains such a depth measurement value by disposing the optical axes of individual cameras in parallel to each other so that disparity is zero at the epipole, and calculating three-dimensional position information of a target point by performing weighted addition based on the size of disparity. A method in Patent Literature 2 performs weighted addition of the reciprocal of a depth in the direction of a sight line, and calculates the depth in the direction of a sight line as the reciprocal of a weighted addition value.

SUMMARY

However, the conventional configurations described in Patent Literature 1 and Patent Literature 2 qualitatively reduce depth measurement error, but do not consider a statistic such as variance of an image noise component as a cause of the depth measurement error. Thus, the depth measurement error cannot be stochastically minimized through weighted addition.

One non-limiting and exemplary embodiment provides an image capturing apparatus, an image processing method, and a non-transitory computer-readable recording medium storing a computer program that achieve reduction of depth measurement error with taken into account image noise distribution.

In one general aspect, the techniques disclosed here feature an image capturing apparatus including: an image capturing unit that includes at least three cameras each of which captures an image; a camera parameter storage unit storing a camera parameter of each camera; and a processing circuit, in which the processing circuit: acquires the images and the camera parameters; extracts pairs of images from the images; calculates, for each of the pairs of images, based on the pairs of images and the camera parameters, position information including information specifying a three-dimensional position of a measurement point with respect to a pair of pixels, one of the pixels being included in one of the pair of images and the other of the pixels being included in the other of the pair of images, and information specifying a position of the one of the pixels in one of the pair of images and a position of the other of the pixels in the other of the pair of images; performs, based on the position information and the camera parameters, weighted addition on the information specifying the three-dimensional position of the measurement point in each of the pair of images, with information using an effective baseline length or a viewing angle with respect to the three-dimensional position, of a pair of the cameras corresponding to the pair of images; and outputs position information of the measurement point to which a weighted addition value is applied.

The above-described comprehensive or specific aspect may be achieved by a system, a device, a method, an integrated circuit, a computer program, or a computer-readable recording medium such as a recording disk, or may be achieved by an optional combination of the system, the device, the method, the integrated circuit, the computer program, and the recording medium. The computer-readable recording medium includes a non-transitory recording medium such as a compact disc-read only memory (CD-ROM).

According to the technology of the present disclosure, depth measurement error can be reduced with taken into account image noise distribution. Additional benefits and advantageous points of an aspect of the present disclosure are clearly described in the present specification and drawings. The benefits and/or the advantageous points are individually provided by various aspects and characteristics disclosed in the present specification and drawings. Thus, not all of the aspects and characteristics are needed to obtain one or more of the benefits and/or the advantageous points.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
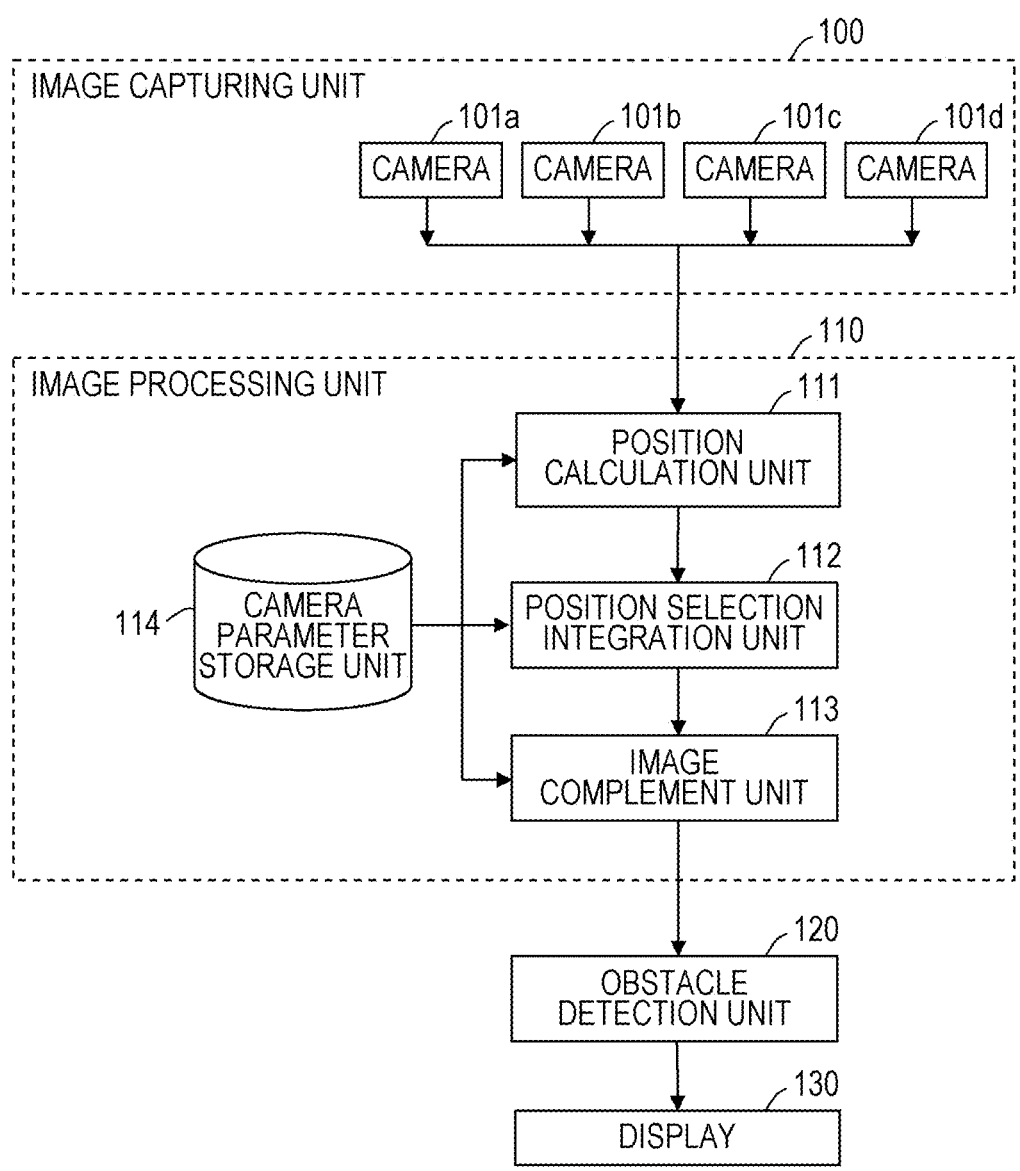
FIG. 1 is a block diagram illustrating configuration of an image capturing apparatus according to an embodiment.

The present inventors have studied improvement of the accuracy of depth measurement in stereoscopic depth measurement using two images captured by a stereo camera including two cameras. The present inventors have also studied error in depth measurement in stereoscopic depth measurement for the technologies described in Patent Literature 1 and Patent Literature 2 described in "BACKGROUND". The technologies described in Patent Literature 1 and Patent Literature 2 qualitatively decrease error in depth measurement but do not consider the influence of any noise component of a camera image as a cause of error in depth measurement. The present inventors have discussed improvement of the accuracy of depth measurement by taking into consideration the influence of the noise component of a camera image. The present inventors have found that, in depth measurement processing in stereoscopic depth measurement, error in depth measurement can be stochastically reduced by weighting a depth measurement result by using a statistic such as variance of the noise component of a camera image. The present inventors have achieved technologies as described below to improve the accuracy of depth measurement.

Specifically, an image capturing apparatus according to an aspect of the present disclosure includes: an image capturing unit that includes at least three cameras each of which captures an image; a camera parameter storage unit storing a camera parameter of each camera; and a processing circuit, in which the processing circuit: acquires the images and the camera parameters; extracts pairs of images from the images; calculates, for each of the pairs of images, based on the pairs of images and the camera parameters, position information including information specifying a three-dimensional position of a measurement point with respect to a pair of pixels, one of the pixels being included in one of the pair of images and the other of the pixels being included in the other of the pair of images, and information specifying a position of the one of the pixels in one of the pair of images and a position of the other of the pixels in the other of the pair of images; performs, based on the position information and the camera parameters, weighted addition on the information specifying the three-dimensional position of the measurement point in each of the pair of images, with information using an effective baseline length or a viewing angle with respect to the three-dimensional position, of a pair of the cameras corresponding to the pair of images; and outputs position information of the measurement point to which a weighted addition value is applied.

In the above-described aspect, the accuracy of depth measurement by stereo vision decreases as the effective baseline length and the viewing angle of a pair of cameras decrease. The effective baseline length and the viewing angle also decrease in stereo vision for an edge position in the field of views of the pair of cameras as compared to stereo vision for the center thereof. A weighted addition value of information specifying a three-dimensional position by using the effective baseline length and the viewing angle can receive reduced influence of variance of the accuracy of depth measurement attributable to the three-dimensional position. Influence on depth measurement error due to noise distribution of a camera image can be reflected on variance of depth measurement error. In addition, the variance of depth measurement error can be associated with the effective baseline length and the viewing angle. The weighted addition value of information specifying a three-dimensional position by using the effective baseline length or the viewing angle reduces the influence of variance of the accuracy of depth measurement attributable to distribution of a noise component of a camera image. Accordingly, reduction of depth measurement error can be achieved.

Preferably, in the image capturing apparatus according to the aspect of the present disclosure, the processing circuit determines a weight applied to the information specifying the three-dimensional position of the measurement point in each of the pair of images, so that variance of the weighted addition value is minimized. According to the above-described aspect, when variance of the weighted addition value is minimized, the weighted addition value can stochastically reduce the influence of variance of the accuracy of depth measurement attributable to noise distribution of a camera image. This achieves stable reduction of depth measurement error.

Preferably, in the image capturing apparatus according to the aspect of the present disclosure, an angle of view of each of the at least three cameras is equal to or larger than 180°. According to the above-described aspect, the image capturing apparatus can perform image capturing in a wide range.

Preferably, in the image capturing apparatus according to the aspect of the present disclosure, in the weighted addition, the processing circuit uses a value obtained by normalizing the effective baseline length to the power of two by the sum of effective baseline lengths to the power of two. In the above-described aspect, the effective baseline length to the power of two is inversely proportional to variance of the depth measurement error and highly correlated with the depth measurement error. In addition, the normalized effective baseline length to the power of two takes a value of 0 to 1, and the sum of the values is equal to one. Thus, the normalized effective baseline length to the power of two does not depend on the sum of the effective baseline lengths to the power of two, but effectively functions as a weight.

Preferably, in the image capturing apparatus according to the aspect of the present disclosure, in the weighted addition, the processing circuit uses a value obtained by normalizing the viewing angle to the power of two by the sum of viewing angles to the power of two. In the above-described aspect, the viewing angle to the power of two is inversely proportional to variance of the depth measurement error and highly correlated with the depth measurement error. In addition, the normalized viewing angle to the power of two takes a value of 0 to 1, and the sum of the values is equal to one. Thus, the normalized viewing angle to the power of two does not depend on the sum of the viewing angles to the power of two, but effectively functions as a weight.

Preferably, in the image capturing apparatus according to the aspect of the present disclosure, the camera parameters include occlusion information on an occluded region in which projection of an object is occluded in the images and an unoccluded region in which the object is projected on the images, and the processing circuit complements a pixel value of the occluded region in a first image among the images, based on a pixel value of the unoccluded region in another image among the images. According to the above-described aspect, it is possible to display an object in the entire field of view of a camera. For example, when the image capturing apparatus is used to monitor the circumference, the monitoring can be performed without a loss across the entire circumference.

An image processing method according to an aspect of the present disclosure is an image processing method includes: (a1) acquiring an image captured by each of at least three cameras; (a2) acquiring a camera parameter of each camera; (a3) extracting pairs of images from the images; (a4) calculating, for each of the pairs of images, based on the pairs of images and the camera parameters, position information including information specifying a three-dimensional position of a measurement point with respect to a pair of pixels, one of the pixels being included in one of the pair of images and the other of the pixels being included in the other of the pair of images, and information specifying a position of the one of the pixels in one of the pair of images and a position of the other of the pixels in the other of the pair of images; (a5) performing, based on the position information and the camera parameter, weighted addition on the information specifying the three-dimensional position of the measurement point in each of the pair of images, with information using an effective baseline length or a viewing angle, with respect to the three-dimensional position, of a pair of the cameras corresponding to the pair of images; and (a6) outputting position information of the measurement point to which a weighted addition value is applied, in which at least one of the processes (a1) to (a6) is executed by a processor. The above-described aspect can achieve an effect same as that of the image capturing apparatus according to the aspect of the present disclosure.

Preferably, in the image processing method according to the aspect of the present disclosure, a weight applied to the information specifying the three-dimensional position of the measurement point in each of the pair of images is determined so that variance of the weighted addition value is minimized.

Preferably, in the image processing method according to the aspect of the present disclosure, an angle of view of each of the at least three cameras is equal to or larger than 180°.

Preferably, in the image processing method according to the aspect of the present disclosure, the weighted addition uses a value obtained by normalizing the effective baseline length to the power of two by the sum of effective baseline lengths to the power of two.

Preferably, in the image processing method according to the aspect of the present disclosure, the weighted addition uses a value obtained by normalizing the viewing angle to the power of two by the sum of viewing angles to the power of two.

Preferably, in the image processing method according to the aspect of the present disclosure, the camera parameters include occlusion information on an occluded region in which projection of an object is occluded in the images and an unoccluded region in which the object is projected on the images, and the image processing method further including: (b1) complements a pixel value of the occluded region in a first image among the images, based on a pixel value of the unoccluded region in another image among the images.

A recording medium according to an aspect of the present disclosure is a non-transitory computer-readable recording medium storing a control program that causes an instrument including a processor to execute processing including: (a1) acquiring an image captured by each of at least three cameras; (a2) acquiring a camera parameter of each camera; (a3) extracting pairs of images from the images; (a4) calculating, for each of the pairs of images, based on the pairs of images and camera parameters, position information including information specifying a three-dimensional position of a measurement point with respect to a pair of pixels, one of the pixels being included in one of the pair of images and the other of the pixels being included in the other of the pair of images, and information specifying a position of the one of the pixels in one of the pair of images and a position of the other of the pixels in the other of the pair of images; (a5) performing, based on the position information and the camera parameters, weighted addition on the information specifying the three-dimensional position of the measurement point in each of the pair of images, with information using an effective baseline length or a viewing angle with respect to the three-dimensional position, of a pair of the cameras corresponding to the pair of images; and (a6) outputting position information of the measurement point to which a weighted addition value is applied. The above-described aspect can achieve an effect same as that of the image capturing apparatus according to the aspect of the present disclosure.

Preferably, in the recording medium according to the aspect of the present disclosure, a weight applied to the information specifying the three-dimensional position of the measurement point in each of the pair of images is determined so that variance of the weighted addition value is minimized.

Preferably, in the recording medium according to the aspect of the present disclosure, the weighted addition uses a value obtained by normalizing the effective baseline length to the power of two by the sum of effective baseline lengths to the power of two.

Preferably, in the recording medium according to the aspect of the present disclosure, the weighted addition uses a value obtained by normalizing the viewing angle to the power of two by the sum of viewing angles to the power of two.

Preferably, in the recording medium according to the aspect of the present disclosure, the camera parameters include occlusion information on an occluded region in which projection of an object is occluded in the images and an unoccluded region in which the object is projected on the images, and the processing further including: (b1) complementing a pixel value of the occluded region in a first image among the images, based on a pixel value of the unoccluded region in another image among the images.

The above-described general or specific aspect may be achieved by a system, a device, a method, an integrated circuit, a computer program, or a computer-readable recording medium such as a recording disk, or may be achieved by an optional combination of the system, the device, the method, the integrated circuit, the computer program, and the recording medium. The computer-readable recording medium includes a non-transitory recording medium such as a CD-ROM.

The following describes an image capturing apparatus and the like according to an embodiment with reference to the accompanying drawings. The embodiment describes below a comprehensive or specific example. A numerical value, a shape, a material, a component, arrangement and connection of components, a step (process), the order of steps, and the like described in the embodiment below are merely exemplary and not intended to limit the present disclosure. Among components in the embodiment below, any component not recited in an independent Claim representing a highest-level concept is described as an optional component. In the following description of the embodiment, a phrase including "substantially" as in "substantially parallel" and "substantially orthogonal" is used in some cases. For example, "substantially parallel" means not only a completely parallel state but also an effectively parallel state, in other words, a state including, for example, a several percent difference. The same applies to any other phrase including "substantially".

Embodiment

The following describes an image capturing apparatus 1 according to the embodiment. The present embodiment describes an example in which the image capturing apparatus 1 is used as an apparatus on board an automobile and configured to sense any obstacle. When provided on board an automobile, the image capturing apparatus 1 may be used to, for example, monitor surroundings of the automobile and support operation of the automobile. The image capturing apparatus 1 may be mounted on any object. For example, the image capturing apparatus 1 may be mounted on a moving object such as a vehicle other than an automobile, a boat, a ship, an air vehicle, or a robot. Examples of vehicles other than an automobile include a truck, a bus, a two-wheel vehicle, a guided vehicle, a train, a construction machine, and a cargo handling machine. The air vehicle may be, for example, an aircraft or a drone.

Figure 2A:
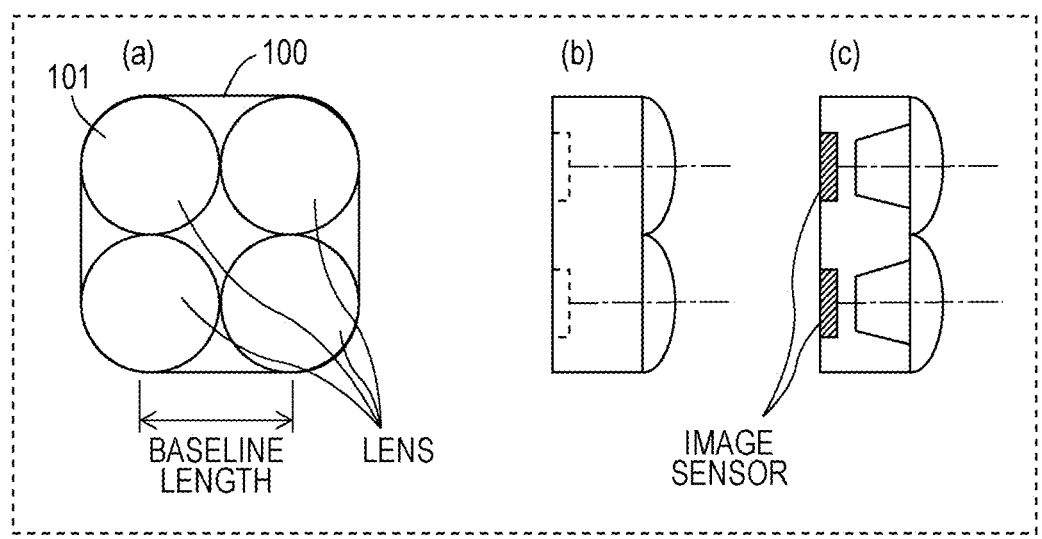
FIG. 2A is a schematic view illustrating an exemplary configuration of an image capturing unit according to the embodiment.
Figure 2B:
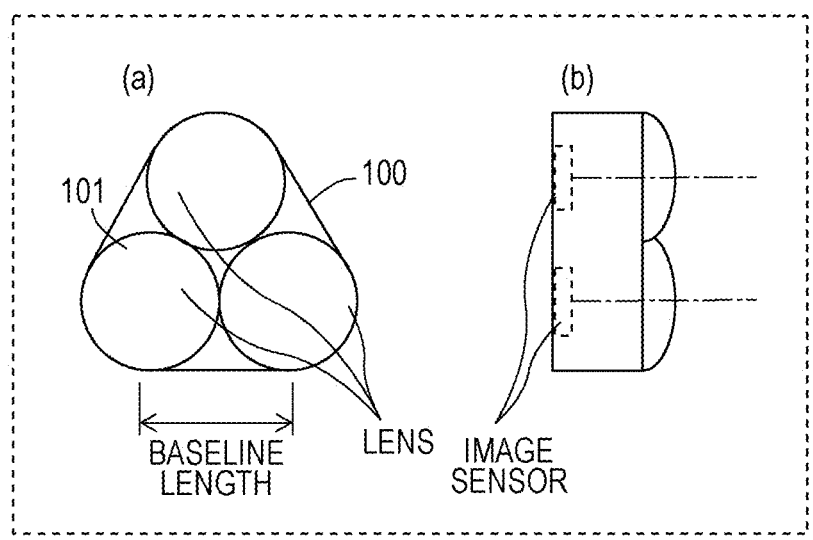
FIG. 2B is a schematic view illustrating another exemplary configuration of the image capturing unit according to the embodiment.

The configuration of the image capturing apparatus 1 will be described with reference to FIGS. 1, 2A, and 2B. FIG. 1 illustrates an exemplary functional configuration of the image capturing apparatus 1 according to the embodiment. FIGS. 2A and 2B illustrate two different exemplary structures of an image capturing unit 100 included in the image capturing apparatus 1. As illustrated in FIG. 1, the image capturing apparatus 1 includes the image capturing unit 100, an image processing unit 110, an obstacle detection unit 120, and a display 130.

The image capturing unit 100 includes three cameras or more. Three cameras or more each include a fish-eye lens. In the present embodiment, the image capturing unit 100 includes four cameras 101a, 101b, 101c, and 101d, but the present disclosure is not limited to this configuration. The four cameras 101a, 101b, 101c, and 101d may be integrated with each other or may be separately disposed. The image processing unit 110 acquires and processes an image captured by each of the cameras 101a, 101b, 101c, and 101d. The image processing unit 110 includes a position calculation unit 111, a position selection integration unit 112, an image complement unit 113, and a camera parameter storage unit 114. The indexes a to d are used to distinguish the four cameras but, when not distinguished, in particular, the cameras are referred to as "cameras 101" without the indexes in some cases.

FIGS. 2A and 2B each illustrate an exemplary configuration of the image capturing unit 100 of the image capturing apparatus 1. FIG. 2A illustrates an exemplary image capturing unit 100 having a configuration in which the four cameras 101 are fixed as an integration. FIG. 2A includes a front view (a), a side view (b), and a cross-sectional view (c) of the image capturing unit 100. The cross-sectional view is a cross-sectional view of the image capturing unit 100 taken along a section passing through the centers of the two lenses of the two cameras 101 of the image capturing unit 100. In FIG. 2A, the four cameras 101 are disposed such that the centers of the lenses thereof are positioned at the apexes of a square. FIG. 2B illustrates another exemplary image capturing unit 100 having a configuration in which the three cameras 101 are fixed as an integration. FIG. 2B includes a front view (a) and a side view (b) of the image capturing unit 100. In FIG. 2B, the three cameras 101 are disposed such that the centers of the lenses thereof are positioned at the apexes of an equilateral triangle.

In the exemplary image capturing unit 100 illustrated in FIG. 2A, the lenses of the cameras 101 are fish-eye lenses having diameters substantially equal to each other. The four cameras 101 illustrated in FIG. 2A have optical axes parallel to each other and are disposed close to two lenses adjacent thereto. Thus, the distance between the optical axes of two adjacent cameras, in other words, the distance between the centers of the lenses thereof is substantially equal to the diameter of each lens. Each camera 101 has a field of view overlapping with the field of view of any adjacent camera 101.

In the exemplary image capturing unit 100 illustrated in FIG. 2B, the lens of each camera 101 are fish-eye lenses having diameters substantially equal to each other. The three cameras 101 illustrated in FIG. 2B have optical axes parallel to each other and are disposed close to two lenses adjacent thereto. Thus, the distance between the optical axes of two adjacent cameras, in other words, the distance between the centers of the lenses thereof is substantially equal to the diameter of each lens. Each camera 101 has a field of view overlapping with the field of view of any adjacent camera 101.

In the present embodiment, the image capturing unit 100 has the exemplary configuration illustrated in FIG. 2A.

As illustrated in FIGS. 2A and 2B, the distance between the optical axes of the cameras 101 adjacent to each other is called a baseline length, and an image sensor is provided on the optical axis of each camera 101 in the image capturing unit 100. The image sensor may be any device that receives incident light through the lens of the camera 101 and form an image from the received light, and may be, for example, a complementary metal-oxide semiconductor (CMOS) image sensor or a charge coupled device (CCD) image sensor.

The image capturing apparatus 1 described above may include at least the image capturing unit 100 and the image processing unit 110. The obstacle detection unit 120 and the display 130 may be included in an instrument provided outside of the image capturing apparatus 1. The externally provided instrument may include, for example, a personal computer (PC) and a display thereof, and use these devices to achieve the obstacle detection unit 120 and the display 130. The image processing unit 110 and the obstacle detection unit 120 may be connected with each other through wired communication or wireless communication. The image processing unit 110 and the obstacle detection unit 120 may be directly connected with each other one-on-one or indirectly connected with each other through a communication network such as the Internet.

The configuration of the cameras 101 in the image capturing unit 100 described above is based on the following knowledge of the present inventors. Specifically, one of the causes of error in estimation of a three-dimensional position in stereo vision is quantization error in disparity estimation. The quantization error is an error that occurs when disparity, which is a real number in reality, is estimated at the accuracy of one pixel. The size of the quantization error can be taken to be constant, and thus, as disparity is larger, in other words, as the length of a disparity vector is longer, the influence of the quantization error is smaller, and thus the three-dimensional position has a higher accuracy. Thus, each pair of cameras in stereo vision are typically disposed so that the baseline length as the distance between the cameras is sufficient to achieve large disparity.

The "disparity" is a difference in the direction or position of an identical target point O when the identical target point is observed from two points A and B different from each other, for example, cameras at two positions different from each other. The disparity may be expressed by, for example, an angle (∠AOB) between a line segment including the point A and the target point O and a line segment including the point B and the target point O. In the present specification, the difference in the direction of the target point in the three-dimensional space and the difference in the position of the target point in a two-dimensional projection image are not distinguished from each other but collectively referred to as disparity.

When captured by a camera including a fish-eye lens, an object image is largely distorted, and the shape of the object image and/or the size thereof and/or the direction thereof differ depending on the three-dimensional position of an object in the field of view, in other words, the position of the object in the image. When stereo vision uses an image IID of an object captured by a camera CCD including a fish-eye lens and an image IIE of the object captured by another camera CCE including a fish-eye lens, the degree of difference between the shape of an object image in the image IID and the shape of an object image in the image IIE is larger, the degree of difference between the size of the object image in the image IID and the size of the object image in the image IIE is larger, and the degree of difference between the direction of the object image in the image IID and the direction of the object image in the image IIE is larger as disparity between the camera CCD and the camera CCE for the object is larger. Thus, it is difficult to estimate disparity between the position of the object in the image IID and the position of the object in the image IIE.

Figure 3:
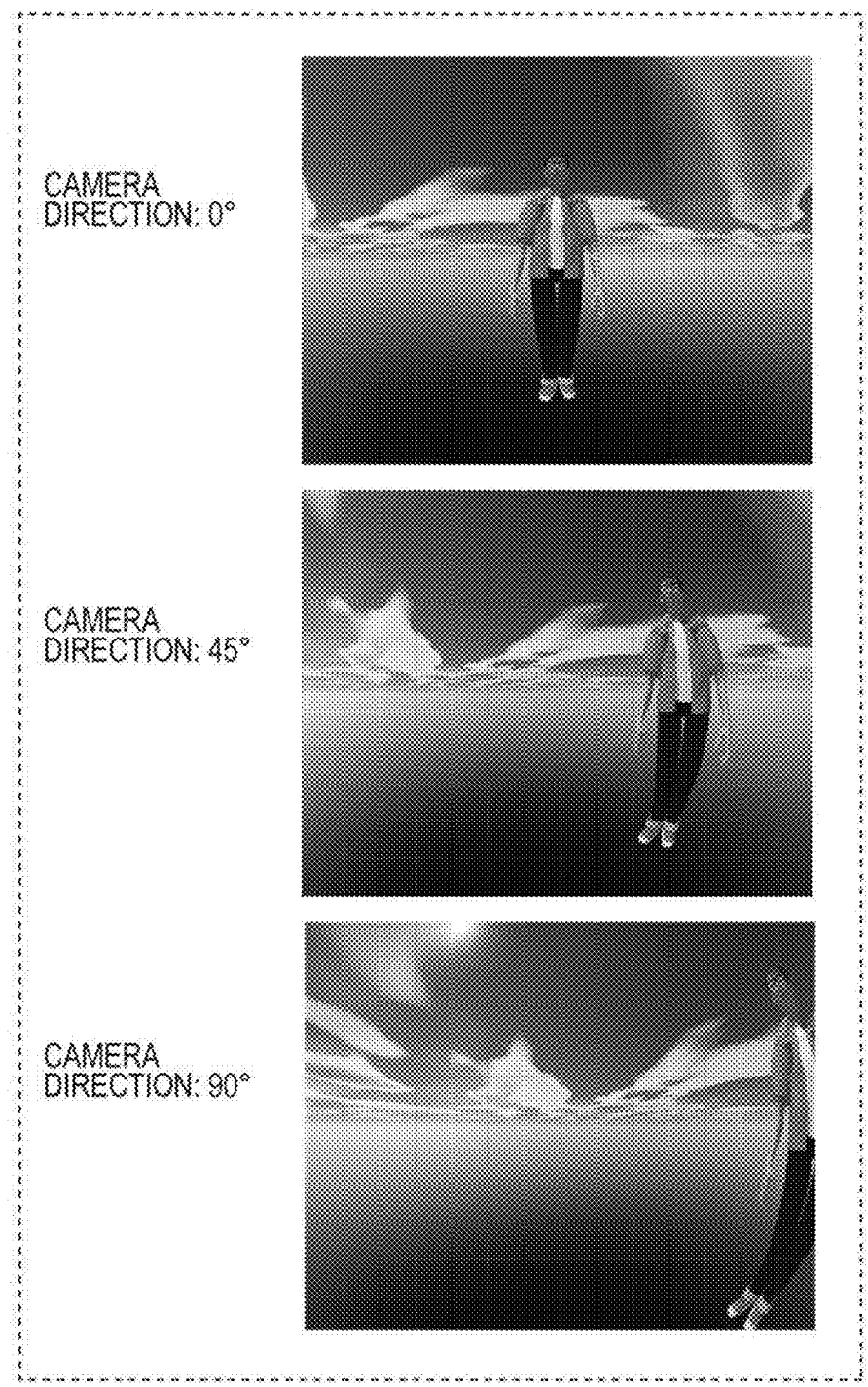
FIG. 3 is a schematic view illustrating exemplary differences in the shape, size, and direction of an object image between positions in an image of the image capturing unit according to the embodiment.

FIG. 3 illustrates exemplary object images captured when the direction of a camera is changed to 0°, 45°, and 90° while the distance between an object and the camera is kept constant (one meter). The camera direction of 0° is the direction of the camera when the optical axis of the camera points to the object. As understood from FIG. 3, the object images have different appearances, in other words, different shapes, sizes, or directions depending on the difference between positions in the images. This is because the degree of distortion due to a fish-eye lens differs with the angle between the optical axis and a straight line including the object and the camera. It can be supposed to be difficult to estimate disparity between an image captured when the camera points in the direction of 0° (the angle between the optical axis and the straight line including the object and the camera is 0°) in FIG. 3 and an image captured when the camera points in the direction of 90° (the angle between the optical axis and the straight line including the object and the camera is 90°) in FIG. 3. The difference in the shape, size, and direction of an object image in such two images is more significant as the baseline length between cameras is longer and the distance between an object and an image capturing apparatus is shorter. Thus, in particular, when the distance between the object and the image capturing apparatus cannot be maintained longer than a certain distance, the influence of this situation can be reduced by setting the baseline length to be shorter.

In the present embodiment, to avoid too large disparity between fish-eye cameras when an object is positioned close to the image capturing apparatus 1, the image capturing unit 100 has a configuration in which the optical axes of the cameras 101 including fish-eye lenses are parallel to each other and the fish-eye lenses are disposed close to each other as illustrated in FIGS. 2A and 2B. Accordingly, the effect of reducing an estimated disparity error can be expected. In addition, the effect of reducing the quantization error in disparity estimation can be expected by using a disparity estimation method having the accuracy of real number.

Figure 4:
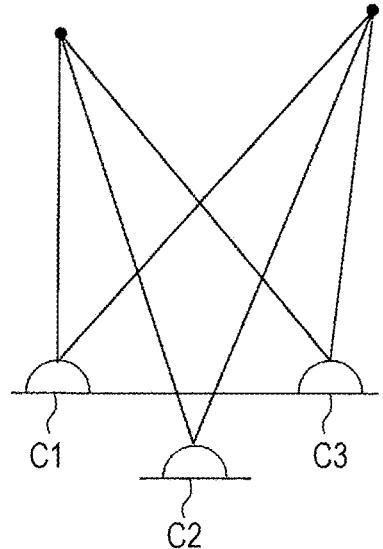
FIG. 4 is a schematic view illustrating an exemplary configuration of an image capturing apparatus according to the related art.

However, when cameras, for example, a first camera and a second camera, each including a fish-eye lens having an angle of view of 180° are disposed close to each other, the lens or body of the first camera is visible in an image captured by the second camera. Specifically, an object behind the first camera, an image of which could be captured by the second camera without the first camera is occluded for the second camera by the lens or body of the first camera and thus is not included in an image captured by the second camera, which is another problem. For example, in a conventional image capturing apparatus including three or more fish-eye cameras C1 to C3 as illustrated in FIG. 4, the baseline length between two cameras, for example, the fish-eye camera C1 and the fish-eye camera C2 is long. With this configuration, when the lens or body of the fish-eye camera C2 is visible in the field of view of the fish-eye camera C1, a region in which the lens or body of the fish-eye camera C2 is visible in the field of view of the fish-eye camera C1 occupies a small fraction of the field of view of the fish-eye camera C1. However, when cameras are disposed close to each other as illustrated in FIGS. 2A and 2B, a larger region in the field of view of a camera included in the cameras is occluded by the lens of any other camera included in the cameras. In addition, images captured by two cameras, respectively are used to calculate the three-dimensional position of a point on an object. Thus, when a point on the object is included in at least one of a region occluded in the field of view of a camera CCF and a region occluded in the field of view of a camera CCG, the three-dimensional position of a point on the object cannot be calculated by using an image captured by the camera CCF and an image captured by the camera CCG. Accordingly, a region in which the three-dimensional position cannot be calculated in the image captured by the camera CCF is the sum of a region included in the object and occluded in the field of view of the camera CCF and a region included in the object and occluded in the field of view of the camera CCG.

To solve the above-described problem, the present inventors have completed the technology of an image capturing apparatus including a camera including a fish-eye lens for an occluded region that is included in an image of an object captured by the camera including a fish-eye lens and in which an image of part of the image capturing apparatus is captured. The technology generates an image of a "part of the object" that would be otherwise captured by the camera including a fish-eye lens without the part of the image capturing apparatus, complements the occluded region with the generated image, and calculates the three-dimensional position of the "part of the object" corresponding to the generated image. Accordingly, an image without occlusion and the three-dimensional position corresponding to this image can be acquired. Information of an occluded region in an image may be acquired in advance based on the physical disposition relation among lenses and the specification of each lens.

In the present specification, a fish-eye lens has an angle of view of substantially equal to 180° or larger than 180°, which is expressed as "substantially equal to or larger than 180°". The angle of substantially 180° includes an angle equal to or smaller than 180°, for example, the angle of 160° to 180°. The angle equal to or larger than 180° includes, for example, the angle of 180° to 230° inclusive.

As illustrated in FIG. 1, in the image capturing apparatus 1, the image capturing unit 100 captures an image included in the field of view of each camera 101 and generates an image obtained by complementing an occluded region in the image captured by the image processing unit 110, and the three-dimensional position of an object in the obtained image. The obstacle detection unit 120 generates a composite image based on the image in the field of view of the image capturing unit 100 and the three-dimensional position of the object in the image, and displays the composite image on the display 130.

The image capturing unit 100 includes the four cameras 101a to 101d, and the four cameras 101a to 101d each include a fish-eye lens having an angle of view substantially equal to 180°. The four cameras 101a to 101d are disposed as illustrated in FIG. 2A. The four cameras 101a to 101d each capture an image in the field of view thereof and output the image (hereinafter, this image is also referred to as a camera image). In other words, the four cameras 101a to 101d outputs four camera images (specifically, image data). The distance between the optical axes of two adjacent cameras 101 may be shorter than the sum of the lens diameters of the two cameras 101. Typically, as the distance between the optical axes of two cameras decreases, the camera image of one of the cameras includes the lens of the other camera in a larger region, and thus an object behind the other camera is occluded in a larger region in the camera image of the one camera. Typically, as the lens diameters of two cameras increase, the camera image of one of the cameras includes the lens of the other camera in a larger region, and thus an object behind the other camera is occluded in a larger region in the camera image of the one camera.

According to the technology of the present disclosure, when the distance between the optical axes of two cameras is shorter than the sum of the lens diameters of two cameras 101, an image in which an object behind one of the cameras is not occluded in the camera image of the other camera and the three-dimensional position of the object can be acquired.

The distance between the optical axes of two adjacent cameras 101 may be substantially equal to the average of the lens diameters of two cameras 101. Typically, as the distance between the optical axes of two cameras decreases, one of the cameras is visible in a larger region in the camera image of the other camera, and an object behind the one camera is occluded in a larger region in the camera image of the other camera. The distance between the optical axes of the two cameras is substantially equal to the average of the lens diameters of the two cameras when the two cameras are disposed closest to each other, in other words, when the lenses of the two cameras contact with each other. In this case, the sum of a region in which an object behind one of the cameras is occluded in the camera image of the other camera and a region in which an object behind the other camera is occluded in the camera image of the one camera is at maximum. In other words, a region in which the three-dimensional position cannot be acquired is at maximum in each of the camera image of the one camera and the camera image of the other camera.

However, according to the technology of the present disclosure, an image having a region in which an object behind one of two cameras is occluded in the camera image of the other camera and the three-dimensional position of the object can be acquired when the distance between the optical axes of the two cameras is substantially equal to the average of the lens diameters of the two cameras. In other words, the technology of the present disclosure achieves a highest effect when the distance between the optical axes of the two cameras is substantially equal to the average of the lens diameters of the two cameras.

As illustrated in FIG. 1, the image processing unit 110 includes the position calculation unit 111, the position selection integration unit 112, the image complement unit 113, and the camera parameter storage unit 114. The camera parameter storage unit 114 stores a camera parameter for each of the four cameras 101 in advance. The camera parameter includes an external parameter, an internal parameter, and occlusion information. The external parameter includes information on physical disposition of the camera, such as the position and direction of the camera. The internal parameter includes information on characteristics of the camera, such as the distortion and focal length of the lens. The occlusion information includes information indicating, in the camera image, not a region in which part of an object is captured but a region in which part of the image capturing apparatus 1 is captured. In other words, the occlusion information includes information indicating a region having no image of part of an object in the camera image of the camera because part of the field of view of the camera is occluded by part of the image capturing apparatus 1. For example, the occlusion information includes information indicating an occluded region included in the camera image of each camera 101 when image capturing is performed by the cameras 101. The occlusion information may be information specifying, in the camera image of each camera 101, a pixel having a pixel value capturing an image of part of the image capturing apparatus 1.

The position calculation unit 111 acquires four camera images (specifically, image data) output from the four cameras 101 and extracts combinations of six pairs of two camera images from among the four camera images. The position calculation unit 111 reads the camera parameter of each of the four cameras 101 from the camera parameter storage unit 114. The position calculation unit 111 calculates the three-dimensional position of an object in each camera image based on estimated disparity between the camera images of each of the six pairs and the external parameter and the internal parameter included in each camera parameter, and outputs the three-dimensional position as position information. The object may occupy the whole region of the camera image.

The position calculation unit 111 generates position information based on the camera parameter. Each position information includes information specifying the position of one point PPn in the three-dimensional space, information specifying the position of a pixel PLIPn included in a camera image III acquired by capturing an object including the point PPn through a camera CCI included in the four cameras 101, and information specifying the position of a pixel PLJPn included in a camera image IIJ acquired by capturing the object including the point PPn through a camera CCJ included in the four cameras 101. The pixel PLIPn is a pixel at which an image obtained by the camera CCI capturing the point PPn is estimated to be observed, and the pixel PLJPn is a pixel at which an image obtained by the camera CCJ capturing the point PPn is estimated to be observed. A method of this estimation will be described later. Thus, each of pieces of position information includes three-dimensional position information related to the one point PPn in the three-dimensional space, and pixel pair information related to the two pixels PLIPn and PLJPn corresponding to the point PPn.

The pixel PLIPn included in the two pixels specified by the pixel pair information is positioned at a point corresponding to the point PPn in the camera image III captured by the camera CCI included in the camera pair, and the pixel PLJPn included in the two pixels specified by the pixel pair information is positioned at a point corresponding to the point PPn in the camera image IIJ captured by the camera CCJ included in the camera pair. The three-dimensional position information related to the point PPn is determined based on the position information specifying the positions of the two pixels PLIPn and PLJPn, and the two pixels PLIPn and PLJPn are included in the different camera images III and IIJ of the cameras CCI and CCJ.

The position selection integration unit 112 acquires the position information output from the position calculation unit 111 and reads the camera parameter of each camera 101 from the camera parameter storage unit 114. The position selection integration unit 112 selects at least part of the position information in which the two pixels specified by the pixel pair information are both not included in an occluded region from the position information based on the occlusion information included in the camera parameter, integrates the selected position information between the camera images of each camera pair, and outputs a result of the integration as selected position integration information. The selected position integration information may be generated from pieces of position information excluding predetermined position information when each predetermined position information includes predetermined pixel pair information and at least one of the two pixels specified by the predetermined pixel pair information is included in an occluded region. The selected position integration information includes the pixel pair information, and the two pixels specified by the pixel pair information are not included in occluded regions in the respective camera images including the two pixels but are positioned at points corresponding to each other between the two camera images. Thus, a point on the object can be specified by using the two pixels specified by the pixel pair information.

The image complement unit 113 acquires the camera images and the selected position integration information output from the position selection integration unit 112. The image complement unit 113 generates a complement image of an occluded region of at least one camera image based on any other camera image based on an unoccluded region of the other camera image and the selected position integration information. Then, the image complement unit 113 outputs the generated complement image and the selected position integration information.

The image complement unit 113 determines the pixel value of a target pixel included in an occluded region and corresponding to the selection pixel in a camera image not including the two pixels by using the pixel value of at least one selection pixel of two pixels specified by the pixel pair information included in the selected position integration information. The target pixel and the selection pixel are positioned at correspondence points corresponding to each other. Whether the target pixel and the selection pixel are positioned at the correspondence points may be determined based on the camera parameter and the three-dimensional position information corresponding to the selection pixel.

The obstacle detection unit 120 acquires the complement image and the selected position integration information, and detects a three-dimensional object such as an obstacle based on the selected position integration information. In addition, the obstacle detection unit 120 outputs a composite image obtained by combining a frame indicating a gaze region in a superimposing manner in a region on the complement image, which corresponds to the position of the detected three-dimensional object.

The display 130 acquires and displays the composite image. The display 130 may be a display panel such as a liquid crystal panel or an organic or inorganic electro luminescence (EL) panel.

Each component included in the image processing unit 110 and the obstacle detection unit 120 illustrated in FIG. 1 may be achieved by hardware such as an electronic circuit or an integrated circuit or may be achieved by software such as a computer program executed on a computer. The computer program may be provided, as an application, through communication via a communication network such as the Internet or communication based on mobile communication standards.

Figure 5:
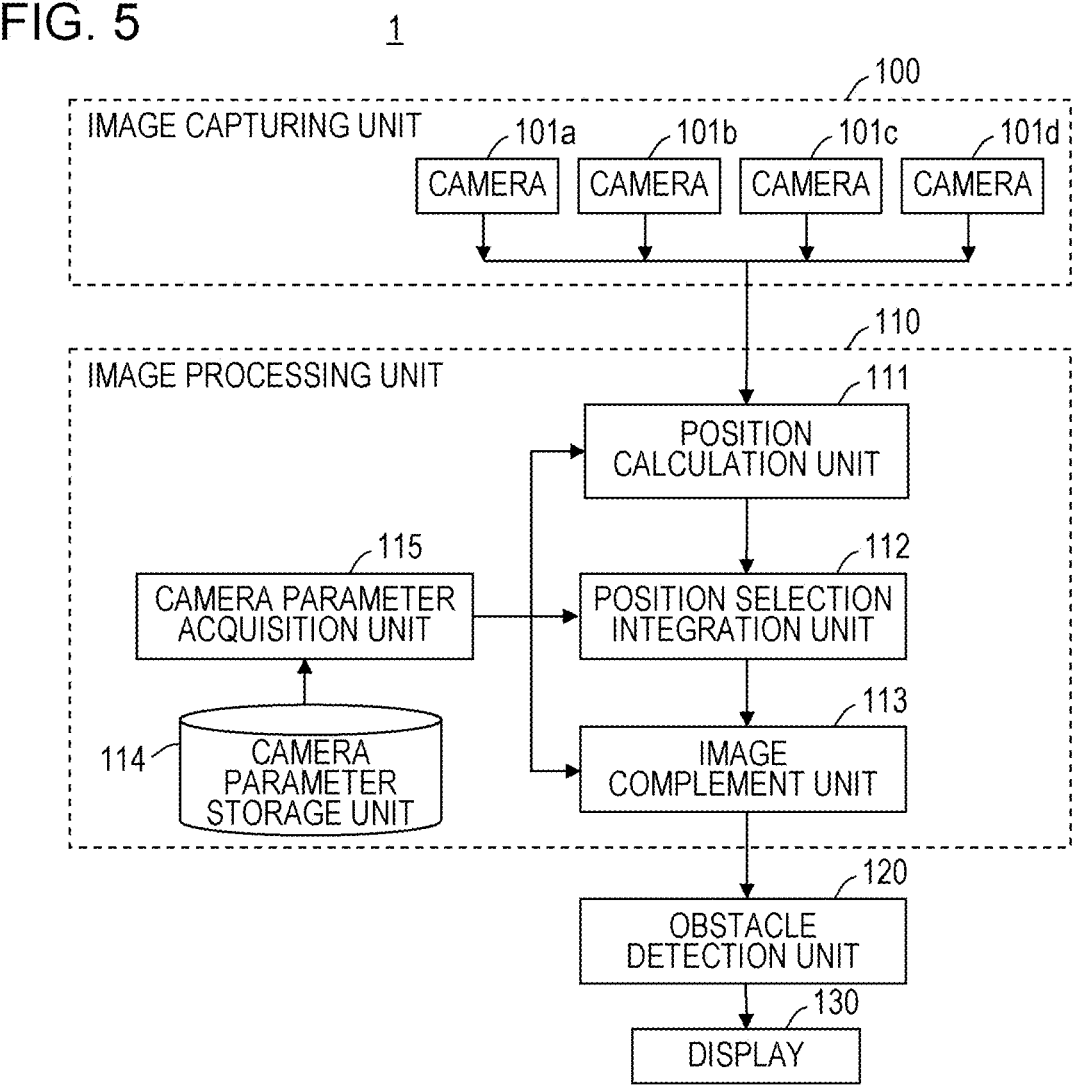
FIG. 5 is a block diagram illustrating configuration of the image capturing apparatus according to a modification of the embodiment.

As illustrated in FIG. 5, the image processing unit 110 may include a camera parameter acquisition unit 115 in addition to the position calculation unit 111, the position selection integration unit 112, the image complement unit 113, and the camera parameter storage unit 114. The camera parameter acquisition unit 115 acquires the camera parameter of each camera 101 from the camera parameter storage unit 114, and outputs the camera parameter to the position calculation unit 111, the position selection integration unit 112, and the image complement unit 113.

The image processing unit 110 may include no camera parameter storage unit 114, and for example, an external device such as a cloud server may include the camera parameter storage unit 114. In this case, the camera parameter storage unit 114 may be connected with the camera parameter acquisition unit 115 through wireless and wired communication means. The camera parameter acquisition unit 115 may acquire information such as the camera parameter stored in the camera parameter storage unit 114. The camera parameter acquisition unit 115 may acquire, from the camera parameter storage unit 114, the camera parameter including the position information of the cameras 101, the focal lengths of the cameras 101, and the occlusion information including information indicating which pixel in the camera image of each of the cameras 101 is included in an occluded region.

In the example illustrated in FIG. 5, the position calculation unit 111, the position selection integration unit 112, and the image complement unit 113 may communicate information with the camera parameter storage unit 114 through the camera parameter acquisition unit 115, and for example, read information stored in the camera parameter storage unit 114. The position calculation unit 111 may read the camera parameter of each of the four cameras 101 from the camera parameter storage unit 114 through the camera parameter acquisition unit 115. The position selection integration unit 112 may obtain position information output from the position calculation unit 111 and read the camera parameter from the camera parameter storage unit 114 through the camera parameter acquisition unit 115.

Figure 6:
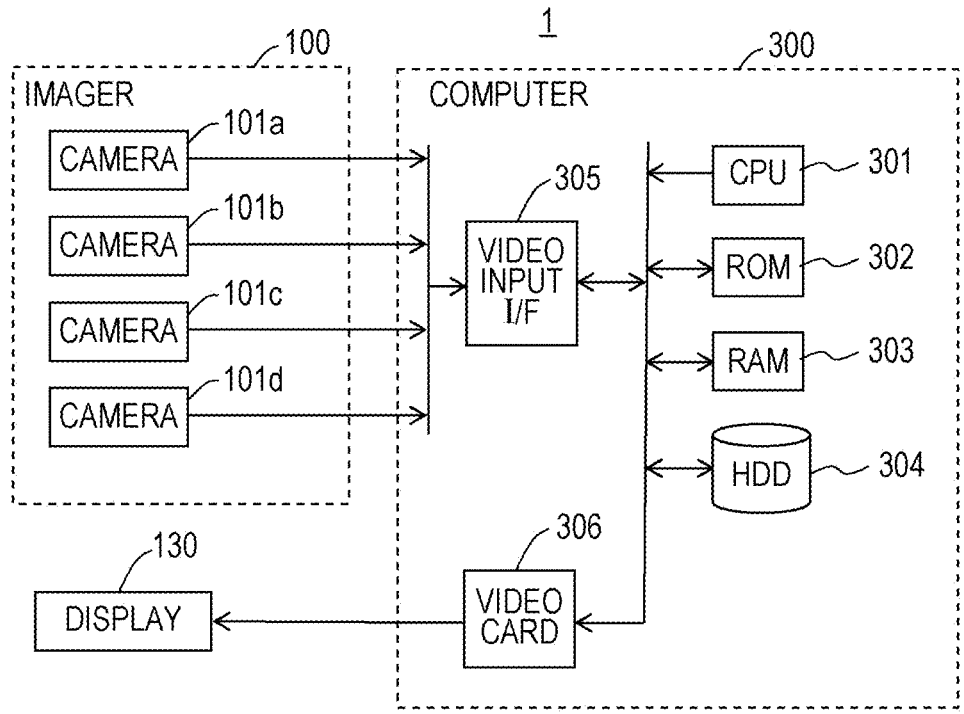
FIG. 6 is a block diagram illustrating the configuration of the image capturing apparatus according to the embodiment including an image processing unit achieved by a computer.

FIG. 6 illustrates an exemplary hardware configuration of the image capturing apparatus 1 according to the embodiment. The image capturing apparatus 1 includes the image capturing unit 100, a computer 300 corresponding to the image processing unit 110 and the obstacle detection unit 120, and the display 130. In the image capturing apparatus 1, the image capturing unit 100 captures an image in the field of view thereof and outputs the image as a camera image, and the computer 300 acquires the output camera image, calculates a complement image and the selected position integration information, and generates and outputs a composite image. The display 130 displays the composite image generated by the computer 300. The three or more cameras 101a, 101b, 101c, . . . correspond to the image capturing unit 100.

The computer 300 includes a central processing unit (CPU) 301, a read only memory (ROM) 302, a random access memory (RAM) 303, a hard disk drive (HDD) 304, a video input interface (I/F) 305, and a video card 306. A computer program that causes the computer 300 to operate is stored in the ROM 302 or the HDD 304 in advance. The computer program is read and loaded from the ROM 302 or the HDD 304 onto the RAM 303 by the CPU 301 as a processor. The CPU 301 executes each coded command in the computer program loaded on the RAM 303. The video input I/F 305 acquires, into the RAM 303, a camera image captured by the image capturing unit 100 in accordance with execution of the computer program. The video card 306 processes an image generated in accordance with execution of the computer program and outputs the processed image to the display 130, and the display 130 displays the image. As described above, the computer 300 corresponds to the image processing unit 110 and the obstacle detection unit 120. The camera parameter storage unit 114 corresponds to the ROM 302, the RAM 303, or the HDD 304.

The computer program is not limited to the ROM 302 or the HDD 304 as a semiconductor, but may be stored in a recording medium such as a CD-ROM. The computer program may be transmitted through, for example, a wired network, a wireless network, or broadcast, and acquired into the RAM 303 of the computer 300.

Figure 7:
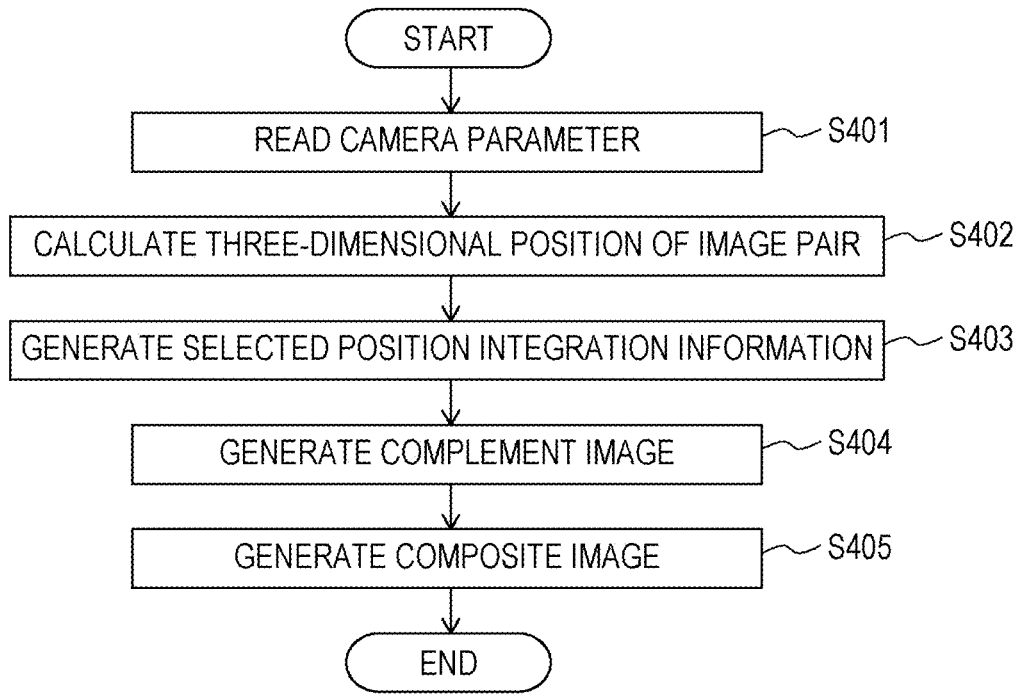
FIG. 7 is a flowchart illustrating an exemplary process of operation of the image processing unit of the image capturing apparatus according to the embodiment.

The following describes operation of the image capturing apparatus 1 according to the embodiment with reference to FIG. 7. FIG. 7 is a flowchart illustrating exemplary operation of the image processing unit 110 and the obstacle detection unit 120 of the image capturing apparatus 1 according to the embodiment. Processing at four steps S401 to S405 in FIG. 7 is executed by the computer 300 in FIG. 6.

Processing at each step in FIG. 7 may be executed by the components included in the image processing unit 110 and the obstacle detection unit 120 in FIG. 5. Specifically, camera parameter reading processing at step S401 may be executed by the camera parameter storage unit 114 and the camera parameter acquisition unit 115, position calculation processing at step S402 may be executed by the position calculation unit 111, position selection integration processing at step S403 may be executed by the position selection integration unit 112, image complement processing at step S404 may be executed by the image complement unit 113, and composite image generation processing at step S405 may be executed by the obstacle detection unit 120.

The present embodiment describes, but is not limited to, an example in which the image capturing apparatus 1 is installed on an automobile. Specifically, the image capturing apparatus 1 detects any obstacle by acquiring a camera image behind the automobile and a three-dimensional position corresponding to the camera image, and displays a result of the detection on a display installed in the automobile to present a situation behind the vehicle to the driver as a user.

Figure 8A:
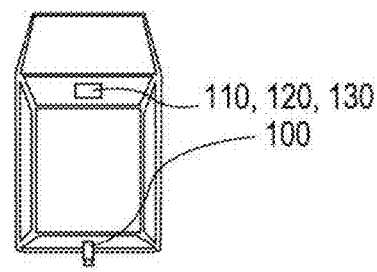
FIG. 8A is a schematic view illustrating exemplary installation of the image capturing apparatus according to the embodiment.
Figure 8B:
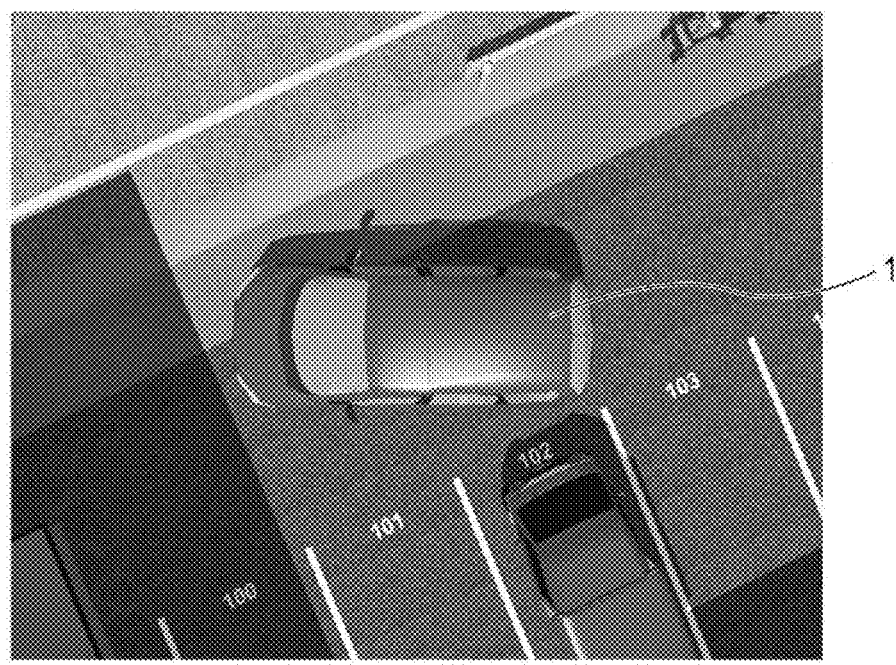
FIG. 8B is a schematic view illustrating an exemplary situation of image capturing by the image capturing apparatus illustrated in FIG. 8A.

FIG. 8A is a plan view illustrating exemplary installation of the image capturing apparatus 1 according to the embodiment to an automobile. The image capturing unit 100 is installed facing backward from a vehicle body at a rear part of the vehicle body so that the optical axis of each camera 101 is substantially aligned with a direction in which the automobile travels straight backward. The image processing unit 110, the obstacle detection unit 120, and the display 130 are installed inside the automobile to be seen from the driver. FIG. 8B is a plan view illustrating an exemplary situation in which image capturing is performed by the image capturing apparatus 1 mounted on the automobile. Although not limited to this configuration, the four cameras 101a to 101d of the image capturing unit 100 capture and output images at a constant time interval in synchronization with each other.

Figure 9A:
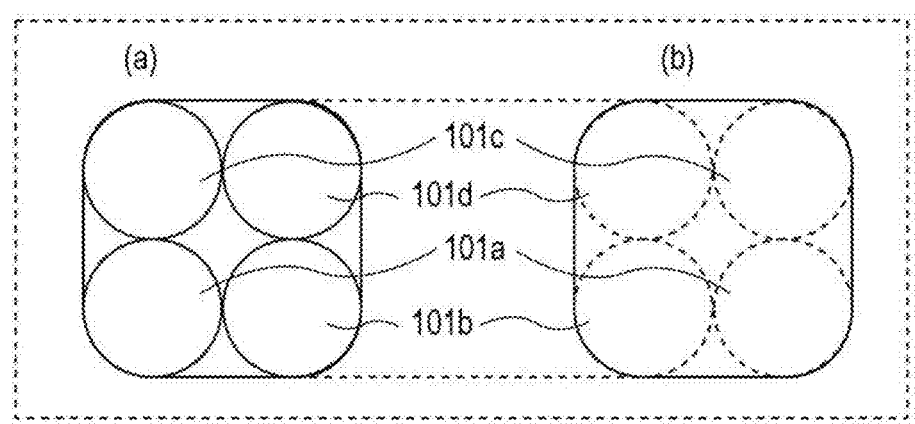
FIG. 9A is a schematic view illustrating an exemplary image capturing apparatus according to the embodiment.
Figure 9B:
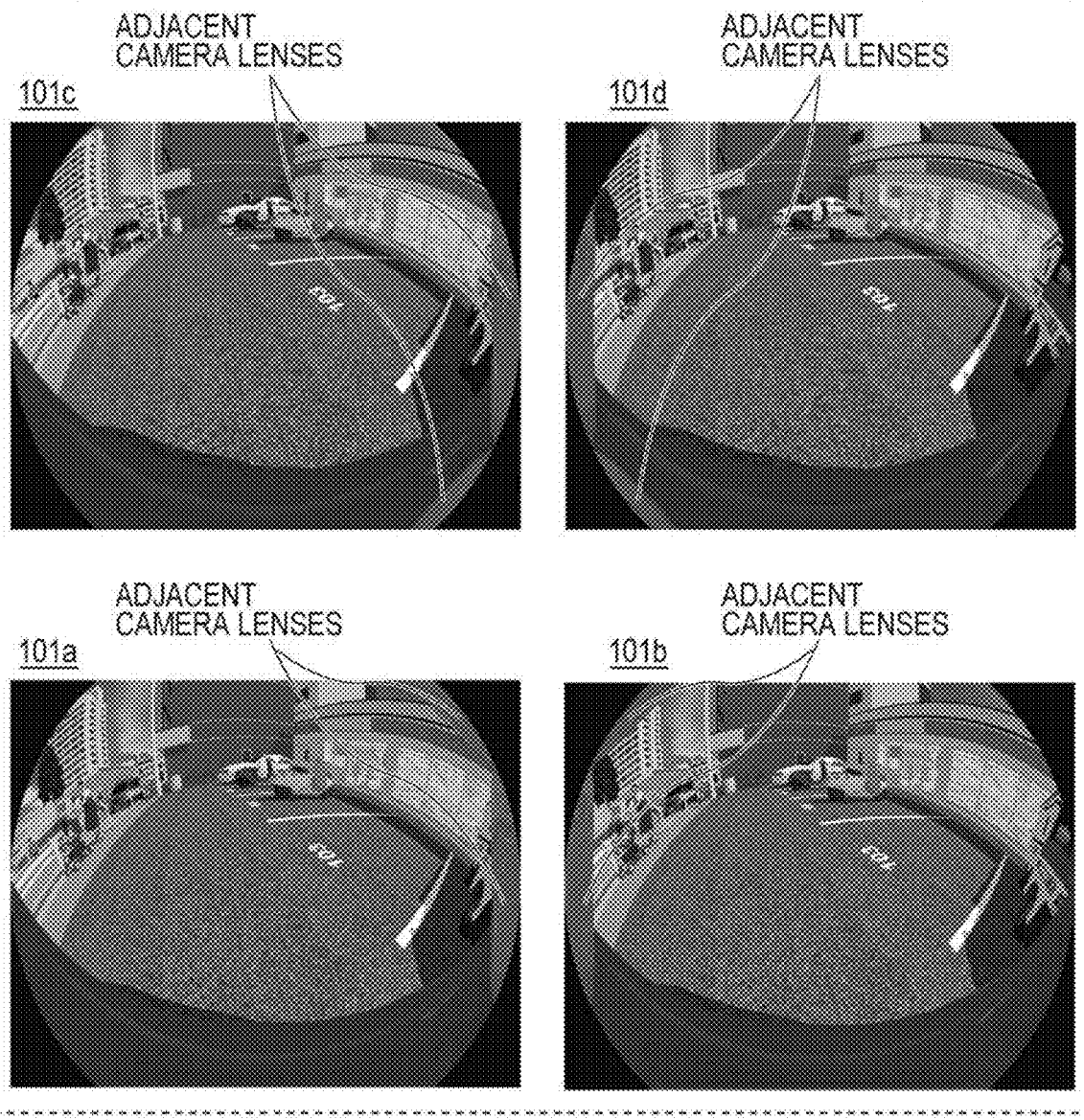
FIG. 9B is a schematic view illustrating an exemplary image captured by the image capturing apparatus illustrated in FIG. 9A.

FIG. 9A includes a front view (a) and a back view (b) illustrating exemplary disposition of the four cameras 101a to 101d of the image capturing unit 100. FIG. 9B illustrates exemplary camera images captured by the four cameras 101a to 101d illustrated in FIG. 9A in an installation situation of the image capturing unit 100 illustrated in FIG. 8A and an image capturing situation illustrated in FIG. 8B. An area inside arcs in touch with right and left ends of each camera image illustrates an object in the field of view having an angle of view of 180°. In the present embodiment, the cameras 101a to 101d each include a fish-eye lens and employ an equidistant projection model. The cameras 101a to 101d and the video input I/F 305 can each capture and acquire a color image having a horizontal length of 1280 pixels and a vertical length of 960 pixels. The above description does not limit the projection model of each camera and the number of pixels in a camera image, but any other projection model and any other number of pixels are applicable. As described above, in the present disclosure, the cameras 101 are disposed close to each other to reduce disparity estimation error due to difference in the shape, size, and direction of an object image between camera images. In the present embodiment, the cameras 101a to 101d illustrated in FIG. 9A have a shortest baseline length of 0.015 m. FIG. 9B illustrates four exemplary camera images captured by the image capturing unit 100 thus configured. The shape, size, and direction of each object in the four camera images in FIG. 9B are substantially same between the images. However, since the cameras 101a to 101d are disposed close to each other, the lens of any adjacent camera is visible at the edge of the field of view in every camera image, and any object behind the lens is occluded. These occluded regions are regions indicated as "occlusion due to adjacent camera lenses" parts in FIG. 9B.

The computer 300 executes, in parallel to operation of the image capturing unit 100, a predetermined computer program to perform processing at steps S401 to S405 in FIG. 7. The following describes in detail processing at steps S401 to S405 executed by the computer 300 with reference to FIG. 1 and FIGS. 9A to 21.

At step S401, the position calculation unit 111 reads, from the camera parameter storage unit 114, the camera parameter of each of the cameras 101a to 101d stored in the camera parameter storage unit 114 in advance and including the internal parameter, the external parameter, and the occlusion information. The processing at step S401 may be executed by the camera parameter acquisition unit 115 illustrated in FIG. 5. The relation between external parameters {Mq,r} and a three-dimensional coordinate set of the camera, and the relation among internal parameters (f, k), a three-dimensional coordinate set of the camera, and a pixel coordinate pair are represented by Equations 1 and 2 below, respectively. Note that, in the specification, the term "coordinate pair" refers to a single combination of a coordinate for one axis and a coordinate for another axis in a two-dimensional Cartesian coordinate system, and the term "coordinate set" refers to a single combination of a coordinate for one axis, a coordinate for another axis, and a coordinate for further another axis in a three-dimensional Cartesian coordinate system.

$$\{M_{q,r}\}, q = 1 \ldots 4, q \neq r \qquad (1)$$

$$\begin{pmatrix} x_r \\ y_r \\ z_r \\ 1 \end{pmatrix} = M_{q,r} \begin{pmatrix} x_q \\ y_q \\ z_q \\ 1 \end{pmatrix}, M = \begin{pmatrix} r_{00} & r_{01} & r_{02} & t_x \\ r_{10} & r_{11} & r_{12} & t_y \\ r_{20} & r_{21} & r_{22} & t_z \\ 0 & 0 & 0 & 1 \end{pmatrix}$$

$$u = \frac{1}{k} \frac{x}{\sqrt{x^2+y^2}} r \qquad (2)$$

$$v = \frac{1}{k} \frac{y}{\sqrt{x^2+y^2}} r$$

$$r = f\theta$$

$$\theta = \tan^{-1}\left(\frac{\sqrt{x^2+y^2}}{z}\right)$$

In Equation 1, r=1, . . . , 4.

In the above-described Equation 1, the external parameters {Mq,r} is a set of matrices representing a positional relation between camera coordinate systems of two cameras q and r. The matrix Mq,r is a 4×4 matrix that converts the three-dimensional position (xq, yq, zq) in the camera coordinate system of the camera q into a three-dimensional position (xr, yr, zr) in the camera coordinate system of the camera r. The internal parameter f represents a focal length, and the internal parameter k represents a pixel size on the image sensor. The above-described Equation 2 represents the relation between a three-dimensional position (x, y, z) in a camera coordinate system and a pixel coordinate pair (u, v) of a camera image. Typically, the external parameters {Mq,r} and the internal parameters (f, k) are obtained in advance by a widely known method called a camera calibration method. Although the above-described Equation 2 uses the internal parameters when the projection model of each lens is the equidistant projection model, an applied projection model is not limited thereto but may be another projection model of, for example, stereographic projection or equi-solid-angle projection.

Figure 10:
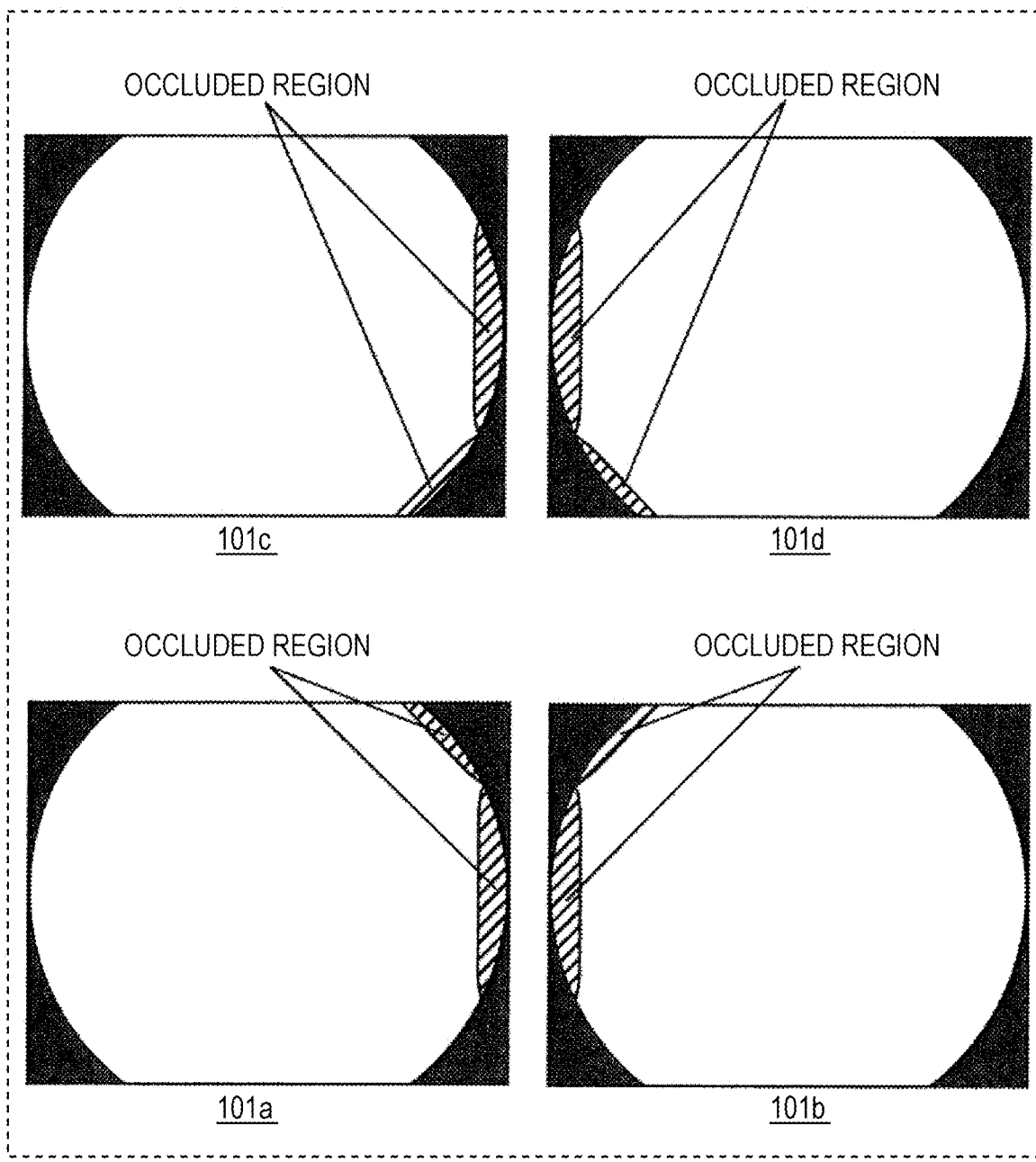
FIG. 10 is a schematic view illustrating exemplary occlusion information in camera images captured by the image capturing unit according to the embodiment.

FIG. 10 illustrates exemplary occlusion information of each of the four cameras 101a to 101d. The occlusion information indicates a region in a camera image, in which a lens or a camera body is visible and any object behind the lens or the camera body is occluded. In the present embodiment, the occlusion information indicates that each pixel of the camera image is in any of three regions of an "object region", an "occluded region", and an "out-of-field-of view region". For example, the occlusion information of a pixel coordinate pair (u, v) of a camera image I is expressed as O (u, v). FIG. 10 illustrates the three states of each pixel such that the object region is colored in white (no color nor pattern), the occluded region is slanted, and the out-of-field-of view region is colored in black. The occlusion information can be produced by capturing an image by each camera 101 in advance and manually determining a region to which each pixel belongs. In the present embodiment, the image capturing apparatus 1 calculates, from each camera image including an occluded region illustrated in FIG. 9B, an image including no occluded region and a three-dimensional position corresponding to the image.

Subsequently at step S402, the position calculation unit 111 acquires camera images (specifically, image data) captured by the cameras 101a to 101d of the image capturing unit 100. Then, the position calculation unit 111 extracts "camera image pairs" from among the acquired camera images. Each of the "camera image pairs" includes two camera images. For example, six "camera image pairs" are extracted from among four camera images captured by the cameras 101a to 101d. In addition, the position calculation unit 111, for each of the camera image pairs, calculates the three-dimensional positions corresponding to points in camera images taken by cameras included in the camera image pair by stereo vision using the camera parameters, corresponding to the cameras, read at step S401. In the stereo vision, (i) first, two camera, positioned at viewpoints different from each other and disposed so that the field of views thereof overlap with each other, capture respective two camera images, (ii) then, a pair of points corresponding to each other, in other words, a pair of correspondence points included in the respective two camera images is obtained, and (iii) finally, a three-dimensional coordinate set of a point on an object for the pair of correspondence points is calculated by using the obtained pair of correspondence points and the camera parameters such as the positions and directions of the two cameras obtained in advance.

The following describes the processing at step S402 in detail. Four camera images captured by the cameras 101a, 101b, 101c, and 101d are referred to as camera images Ia, Ib, Ic, and Id, respectively. Six pairs of images (Ia, Ib), (Ia, Ic), (Ia, Id), (Ib, Ic), (Ib, Id), and (Ic, Id) each including two camera images are extracted from the camera images Ia, Ib, Ic, and Id. Hereinafter, a pair of images is also referred to as an image pair. Then, pairs of correspondence points are detected for each of the image pairs. Each of the pairs of correspondence points has points included in camera images. The one of the points is included in one of the camera images and the other of the points is included in the other of the camera images. The points correspond to each other. For example, when the camera 101a captures a point on an object as a point PIa included in the camera image Ia, and the camera 101b captures the point on the object as a point PIb included in the camera image Ib, the point PIa and the point PIb are a pair of correspondence points. It may be expressed that the point PIa and the point PIb are points corresponding to each other or correspondence points corresponding to each other, or it may be expressed that the point PIa corresponds to the point PIb. A pair of correspondence points may be expressed with a pair of pixels. For example, the pair of correspondence points of the point PIa and the point PIb may be expressed with a pair of a pixel at the point PIa and a pixel at the point PIb. Alternatively, a pair of correspondence points may be expressed with pixel coordinate pairs. For example, the pair of correspondence points of the point PIa and the point PIb may be expressed with an image coordinate pair of the point PIa and an image coordinate pair of the point PIb. For example, in a case of an image pair (Ia, Ib), a corresponding pixel on the camera image Ib is detected for each pixel on the camera image Ia. Specifically, a pixel coordinate pair (uan, vbn) on the camera image Ib corresponding to a pixel coordinate pair (uan, van) on the camera image Ia are detected. The index n is 1, . . . Na, where Na is the number of pixels on the camera image Ia. When the pixel coordinate pair (uan, van) on the camera image Ia and the pixel coordinate pair (ubn, vbn) on the camera image Ib correspond to each other, a pixel value is (uan, van) of a pixel at the pixel coordinate pair (uan, van) and a pixel value ib (ubn, vbn) of a pixel at the pixel coordinate pair (ubn, vbn) are equal to each other. This is referred to as intensity constraint.

An image of one object occupies adjacent pixels in a camera image, and thus, a point included in the camera image Ib and corresponding to a point specified by a pixel adjacent to the pixel coordinate pair (uan, van) on the camera image Ia is likely to be near the pixel coordinate pair (ubn, vbn) on the camera image Ib. This is referred to as smoothness constraint. A pair of points included in the respective camera images Ia and Ib and corresponding to each other, in other words, a pair of correspondence points can be obtained by estimating a pair of the pixel coordinate pair (uan, van) and the pixel coordinate pair (ubn, vbn) that best satisfy the above-described two conditions of the intensity constraint and the smoothness constraint. Combination information of a pixel coordinate pair on the camera image Ia and a pixel coordinate pair on the camera image Ib corresponding to the pixel coordinate pair on the camera image Ia may be referred to as pixel pair information.

For example, C. Zach, T. Pock, and H. Bischof, "A duality based approach for realtime TV-L1 optical flow", In Proceedings of the 29th DAGM conference on Pattern recognition, 2007, pp. 214-223 (Non-Patent Literature 1), and M. Werlberger, T. Pock, and H. Bischof, "Motion estimation with nonlocal total variation regularization", IEEE Conference on Computer Vision and Pattern Recognition (CVPR), Jun. 13-18, 2010, pp. 2464-2471 (Non-Patent Literature 2) describe, in detail, a correspondence point search method and a motion estimation method that calculate pixel coordinate pairs corresponding to each other between two camera images at the accuracy of real number. These methods are known conventional technologies, and thus detailed description thereof will be omitted. For example, in the method described in Non-Patent Literature 1, an energy evaluating function for a whole image is defined to be a weighted sum of the L1 norm of optical flow restriction and total variation, and flow (disparity or motion vector) that minimizes the function is calculated for all pixels in the image. In the method described in Non-Patent Literature 2, the total variation in Non-Patent Literature 2 is weighted with a color difference between correspondence points in a pair and a difference between pixel coordinate values of the correspondence points in the pair.

Subsequently, the three-dimensional position (xan, yan, zan) of a point on an object for each pair of correspondence points is calculated by solving simultaneous equations in Equation 3 below for the pair of correspondence points by using the pixel coordinate pair (uan, van) and the pixel coordinate pair (ubn, vbn) of correspondence points on the respective camera images Ia and Ib and external parameters Mb,a and internal parameters fa, ka, fb, and kb of the cameras 101a and 101b obtained in advance. In the present embodiment, the three-dimensional position has a coordinate value in the viewpoint coordinate system (also referred to as the camera coordinate system) of the camera 101a, but the viewpoint coordinate system of the camera 101b may be applied. The internal parameters fa and ka are the focal length and the unit pixel size of the camera 101a, respectively, and the internal parameters fb and kb are the focal length and the unit pixel size of the camera 101b, respectively. Similarly, the three-dimensional position is calculated for the other five image pairs.

$$u_a = \frac{1}{k_a} \frac{x_a}{\sqrt{x_a^2 + y_a^2}} f_a \tan^{-1} \frac{\sqrt{x_a^2 + y_a^2}}{z_a}$$

$$v_a = \frac{1}{k_a} \frac{y_a}{\sqrt{x_a^2 + y_a^2}} f_a \tan^{-1} \frac{\sqrt{x_a^2 + y_a^2}}{z_a}$$

$$u_b = \frac{1}{k_b} \frac{x_b}{\sqrt{x_b^2 + y_b^2}} f_b \tan^{-1} \frac{\sqrt{x_b^2 + y_b^2}}{z_b}$$

$$v_b = \frac{1}{k_b} \frac{y_b}{\sqrt{x_b^2 + y_b^2}} f_b \tan^{-1} \frac{\sqrt{x_b^2 + y_b^2}}{z_b}$$

$$\begin{pmatrix} x_a \\ y_a \\ z_a \\ 1 \end{pmatrix} = M_{b,a} \begin{pmatrix} x_b \\ y_b \\ z_b \\ 1 \end{pmatrix} \qquad (3)$$

For example, Takashi Matsuyama, et al., "Computer vision", Shin-Gijutsu Communications Co., Ltd., pp. 123-137 (Non-Patent Literature 3) describes, in detail, a two-eye stereo method of calculating the three-dimensional position of a point on an object for a pair of correspondence points based on the pair of correspondence points on two camera images and two camera positions, and a method of converting a coordinate value between two three-dimensional coordinate systems. These methods are conventionally known technologies, and thus detailed description thereof will be omitted. For example, Non-Patent Literature 3 describes, in detail, association in the stereo vision in the eighth section "stereo vision" on pp. 123 to 137, and describes conversion of a coordinate value between two three-dimensional coordinate systems on p. 39.

Through the detailed processing at step S402, the position calculation unit 111 calculates, for each of the six image pairs, sets of "the positions of correspondence points specified in pairs of correspondence points and the three-dimensional position of a point on an object for each pair of correspondence points", and outputs these positions as position information. For example, {Pq,r,n} (n=1, . . . , Nq) for the two camera images Iq and Ir represents Nq pieces of the position information of "correspondence points specified in pairs of correspondence points and a point an object for each pair of correspondence points" for the two camera images Iq and Ir. Pq,r as an aggregation of Nq pieces of the position information Pq,r,n is expressed by Equation 4 below. When there are m image pairs of image pair 1 to image pair m, Ptotal represents position information of {(all pieces of the position information of "correspondence points specified in pairs of correspondence points and a point an object for each pair of correspondence points" related to the image pair 1), . . . , (all pieces of the position information of "correspondence points specified in pairs of correspondence points and a point an object for each pair of correspondence points" related to the image pair m}. In the present embodiment, since the camera images Ia, Ib, Ic, and Id captured by the respective four cameras are assumed, Ptotal is expressed as {Pa, b, Pa,c, Pa,d, Pb,c, Pb,d, Pc,d}.

$$P_{q,r} = \{P_{q,r,n}\}, (n = 1 \ldots N_q) \qquad (4)$$

$$= \{(u_{qn}, v_{qn}, u_{rn}, v_{rn}, x_{qn}, y_{qn}, z_{qn})\}$$

The position information may include the pixel pair information specifying pixels of two respective correspondence points specified by a pair of correspondence points, and the three-dimensional position of a point on an object corresponding to a pair of pixels specified by the pixel pair information. The pixel pair information may include the pixel coordinate pairs of two pixels corresponding to each other between two camera images. In this manner, at step S402, the position calculation unit 111 calculates the three-dimensional position of a point on an object by the stereo vision based on two images among images captured by the cameras 101 and the camera parameters of the two cameras, and outputs the information including the three-dimensional position.

Subsequently at step S403, the position selection integration unit 112 acquires the occlusion information read at step S401 and the position information Ptotal calculated at step S402, and generates selected position integration information P'total={P'a,b, P'a,c, P'a,d, P'b,c, P'b,d, P'c,d} from the position information Ptotal={Pa, b, Pa,c, Pa,d, Pb,c, Pb,d, Pc,d}. Specifically, the position selection integration unit 112 repeats selection integration processing described below for all pairs of correspondence points included in the position information Ptotal.

The position selection integration unit 112 reads, for a pair of two camera images, for example, the camera images Ia and Ib, the coordinate value (uan, van) of a correspondence point on the camera image Ia and the coordinate value (ubn, vbn) of a correspondence point on the camera image Ib from the position information Pa, b, n included in the position information Ptotal. Then, the position selection integration unit 112 reads, from occlusion information Oa of the camera image Ia and occlusion information Ob of the camera image Ib, the occlusion information Oa (uan, van) as the occlusion information of a correspondence point having the coordinate value (uan, van) on the camera image Ia, and the occlusion information Ob (ubn, vbn) as the occlusion information of a correspondence point having the coordinate value (ubn, vbn) on the camera image Ib. When the occlusion information Oa (uan, van) indicates an "object region" and the occlusion information Ob (ubn, vbn) indicates an "object region", the position selection integration unit 112 selects the position information Pa, b, n. When at least one of the occlusion information Oa (uan, van) and the occlusion information Ob (ubn, vbn) indicates an "occluded region" or an "out-of-field-of view region", the position selection integration unit 112 does not select the position information Pa, b, n.

The position selection integration unit 112 performs this selection operation for all pieces of position information Pa, b, n (n=1, Na) of the pair of the two camera images Ia and Ib, and sets a set of pieces of the selected position information to be the selected position integration information P'a,b. In addition, the position selection integration unit 112 performs the selection operation for all pairs of correspondence points included in the position information of all pairs of camera images other than the pair of the two camera images Ia and Ib. Specifically, the position selection integration unit 112 generates P'a,c from Pa,c, P'a,d from Pa,d, P'b,c from Pb,c, P'b,d from Pb,d, and P'c,d from Pc,d. Accordingly, the position selection integration unit 112 generates the selected position integration information P'total={P'a,b, P'a,c, P'a,d, P'b,c, P'b,d}.

The selected position integration information may be generated from pieces of position information excluding predetermined position information. In this case, each excluded predetermined position information may include predetermined pixel pair information, and at least one of pixels specified by the predetermined pixel pair information may be included in an occluded region.

Figure 11:
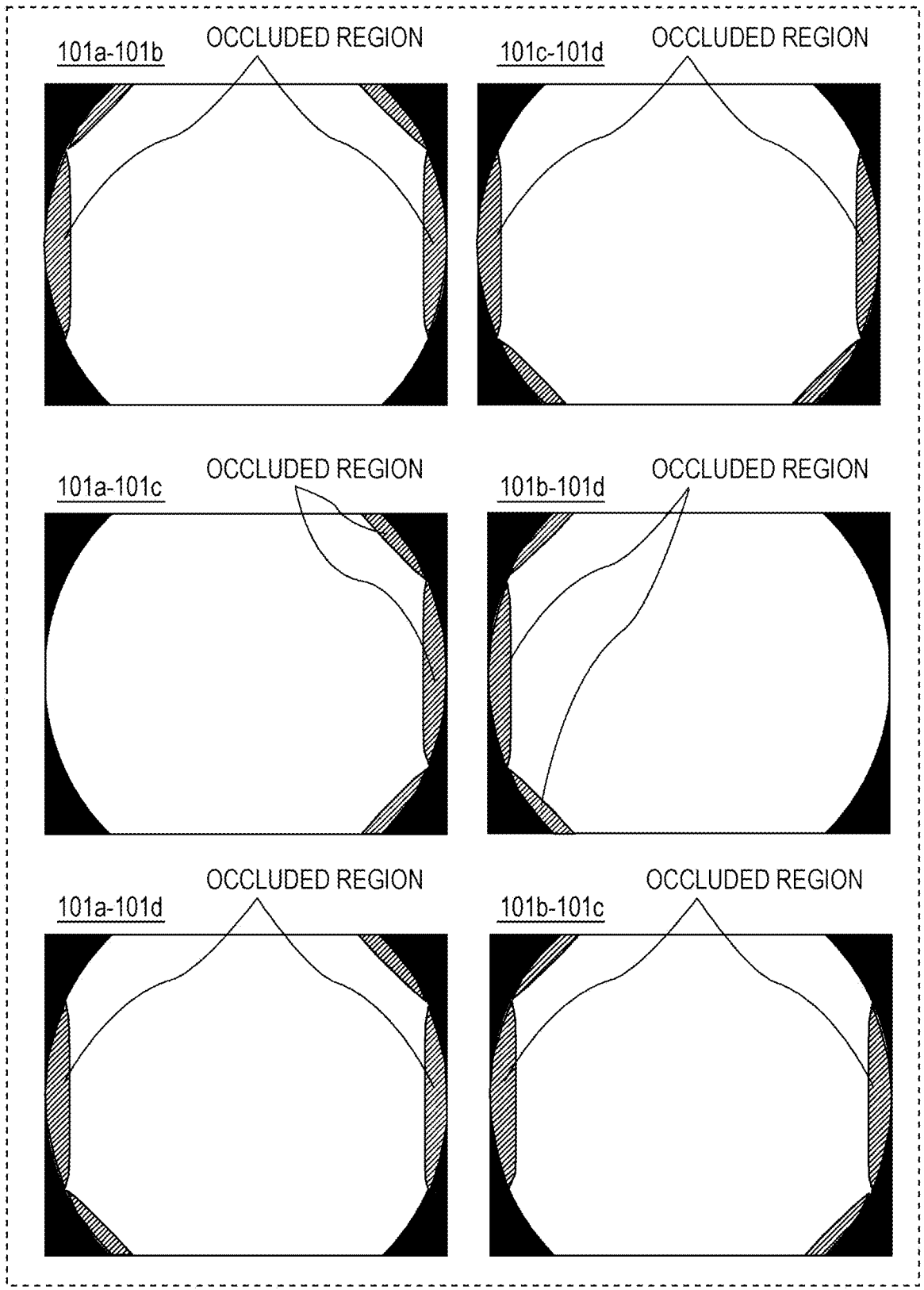
FIG. 11 is a schematic view illustrating an exemplary occluded region in each pair of images captured by the image capturing unit according to the embodiment.

FIG. 11 is a conceptual diagram illustrating the relation between the position information Pa,b, Pa,c, Pa,d, Pb,c, Pb,d, and Pc,d corresponding to the image pairs (Ia, Ib), (Ia, Ic), (Ia, Id), (Ib, Ic), (Ib, Id), and (Ic, Id), respectively, and the occlusion information. For example, in the diagram of "camera 101a-101b", a region including each pixel of the camera image Ia of the camera 101a is illustrated based on the position information Pa,b calculated from the two camera images Ia and Ib of the cameras 101a and 101b. Specifically, an "out-of-field-of view region" is illustrated in black, an "occluded region" is slanted, and an "object region" is illustrated in white (no color nor pattern). An upper-right region of the camera image Ia of the camera 101a and an upper-left region of the camera image Ib of the camera 101b illustrated in FIG. 10 are occluded regions, and thus three-dimensional positions cannot be measured based on the position information in both of the occluded region of the camera 101a and the occluded region of the camera 101b. Thus, in the diagram of "camera 101a-101b" illustrated in FIG. 11, occluded regions appear in upper-right and upper-left regions. However, occluded regions appear in different places for other pairs of cameras, in other words, for other image pairs. For example, an upper-left region is not an occluded region in the diagram of "camera 101a-101c", and an upper-right region is not an occluded region in the diagram of "camera 101b-101d". Thus, position information including no occluded region can be obtained by selecting and collecting an object region being not occluded, in other words, a white region in FIG. 10 from position information calculated from image pairs. Any unoccluded region (white region) collected based on this idea corresponds to the selected position integration information P'total selected at step S403. For example, P'total related to the camera images Ia, Ib, Ic, and Id captured by the respective four cameras is P'total={P'a,b, P'a,c, P'a,d, P'b,c, P'b,d, P'c,d}. For example, P'a,b is information including the position information of an unoccluded region (white region) in the diagram of "camera 101a-101b" illustrated in FIG. 11, in other words, the pixel pair information specifying pixels of two respective correspondence points specified by a selected pair of correspondence points, and the three-dimensional position of a point on an object corresponding to a pair of pixels specified by the pixel pair information.

The following describes the above-described unoccluded region (white region) of each camera. Pieces of the selected position integration information can be obtained in a region not affected by occlusion due to the lens. For example, when the camera 101a is focused on as a reference camera, position information can be obtained based on a pair of camera images for each of three camera pairs of "camera 101a-101b, 101a-101c, and 101a-101d". Integration of these three pieces of position information will be described below.

Figure 12:
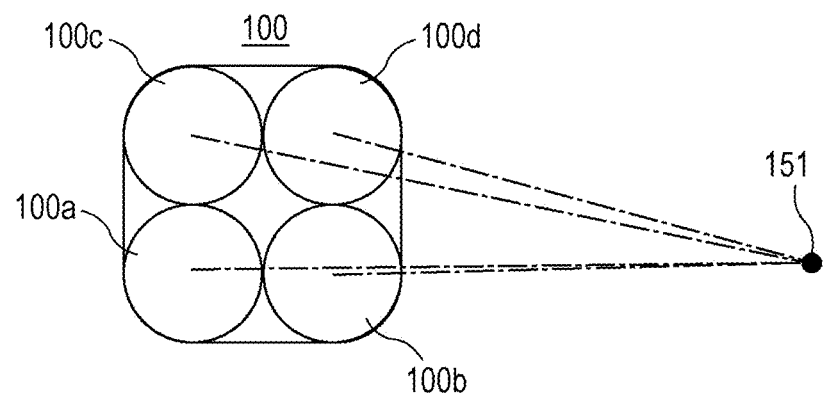
FIG. 12 is an explanatory diagram illustrating a positional relation between a four-lens camera and a measurement point.

FIG. 12 illustrates a diagram for description of a case in which the position information of an object is obtained by the four the cameras 101a to 101d. In FIG. 12, the four cameras are denoted by reference signs identical to those in FIG. 9A, and a measurement point 151 is set. When the camera 101a is a reference camera, information of a three-dimensional position as the position information of the measurement point 151 is acquired by each pair of "camera 101a-101b, 101a-101c, and 101a-101d". When position information is acquired from a pair of cameras, it has been known that a baseline length that is the distance between the cameras is affected by error in the position information.

When position information is acquired by a pair of typical cameras each having an angle of view narrower than that of a fish-eye lens, the baseline length can be regarded to be substantially constant in a captured image in practical use. However, when position information is acquired by a pair of cameras each including a fish-eye lens, an apparent length of the baseline length largely changes in a captured image. The apparent length of the baseline length corresponds to and is correlated with the size of a viewing angle formed by two sight lines extending from the lenses of two cameras to an object. Thus, the apparent length of the baseline length is referred to as an effective baseline length in the present specification. The effective baseline length will be described later. The effective baseline length changes in accordance with the direction of one of the cameras when viewed from the other camera (which is the direction of the baseline) and the position of the one camera in a camera image, and accordingly, error in position information acquired in accordance with the changing effective baseline length changes. In the technologies of Patent Literature 1 and Patent Literature 2, weighted addition calculations different from each other are performed to integrate pieces of position information. The error in position information can be qualitatively reduced by these weighted addition calculations, but the following describes a method of minimizing, with taken into account an error factor at acquisition, error in position information as a result of the integration with the weighted addition.

The following describes, as error in position information, error in the depth direction of a pixel from the optical center of a camera. When position information is acquired, each camera used for the acquisition is calibrated in advance. A formula in the three-dimensional space is known for the relation between the coordinate pair (u, v) of a pixel on a camera image captured by the camera and the incident angle of light beam from the position of an object to the optical center of the camera, in other words, light beam passing through the pixel coordinate pair (u, v). Thus, the depth and the position information (X, Y, Z) can be mutually converted to each other by using the camera parameter.

A camera image captured by a camera contains noises such as dark current and shot noise. These noises are modeled by a Gaussian distribution.

Calculation at stereoscopic depth measurement is performed on an assumption that pixel values at correspondence points are equal, but when association, in other words, disparity estimation is performed between images containing noises, error generates in a disparity estimation value. The disparity error is proportional to a ratio of the size of noise and the gradient of intensity in a direction along an epipolar line as indicated by Equation 5 below.

$$\Delta u \propto \frac{\varepsilon}{\left(\frac{\partial I}{\partial n}\right)} \quad (5)$$

In Equation 5 above, $\Delta u$ represents the disparity error, $\varepsilon$ represents noise in a pixel value, and $\partial I/\partial n$ represents the gradient of a pixel value in the epipolar line direction, that is, the gradient of intensity. When an equidistant projection model is assumed as the projection model of a fish-eye lens, an angle error $\Delta \Phi$ in a disparity estimation result is also proportional to the ratio of the size of noise and the gradient of intensity in the direction along the epipolar line as indicated by Equation 6 below. The noises $\varepsilon$ in Equations 5 and 6 is expressed as Equation 7 below. Specifically, the noises ε obeys a normal distribution having a mean of 0 and a variance of $\sigma^2$.

$$\Delta \Phi \propto \frac{\varepsilon}{\left(\frac{\partial I}{\partial n}\right)} \qquad (6)$$

$$\varepsilon \sim N(0, \sigma^2) \qquad (7)$$

Figure 13:
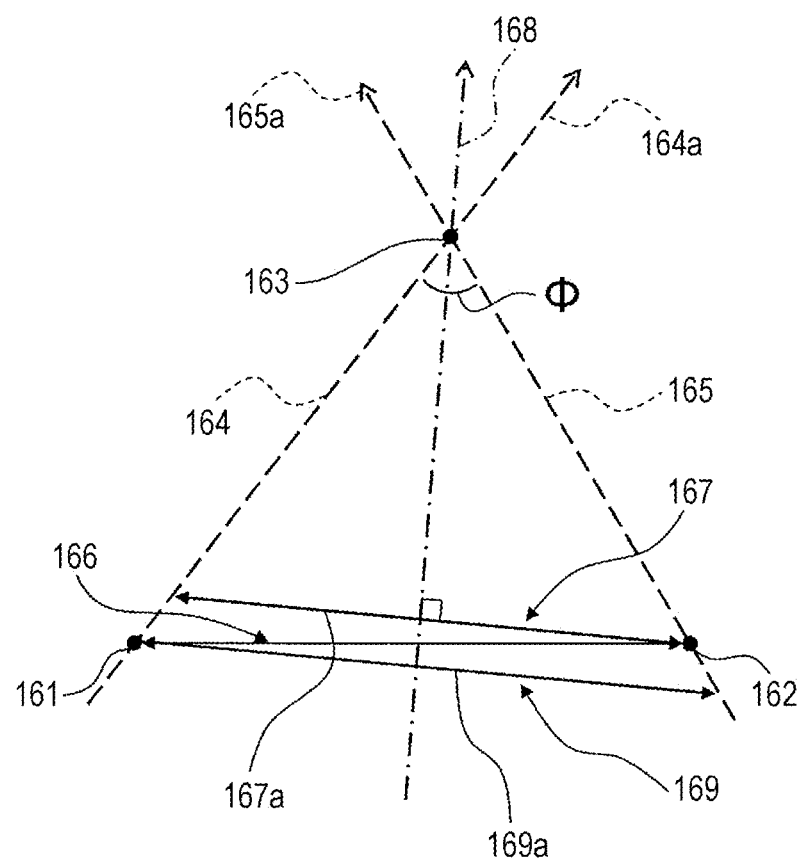
FIG. 13 is an explanatory diagram illustrating a relation between triangulation and an effective baseline length.

The following describes the relation between the effective baseline length and the angle error in triangulation with two cameras (a camera 1 and a camera 2) with reference to FIG. 13. In FIG. 13, a projection center 161 is the projection center of the camera 1 as one of the two cameras, and a projection center 162 is the projection center of the camera 2 as the other camera. A measurement point 163 is a target point for which triangulation is performed by using the cameras 1 and 2. A sight line 164 is a sight line when the measurement point 163 is viewed from the camera 1, and a sight line 165 is a sight line when the measurement point 163 is viewed from the camera 2. A baseline length 166 is the actual distance between the cameras 1 and 2. An effective baseline length 167 corresponds to an apparent distance between the cameras 1 and 2 when the cameras are viewed from the measurement point 163, and is an apparent baseline length from the measurement point 163.

Straight lines 164a and 165a in the respective directions of the sight lines 164 and 165 form an internal angle Φ at the measurement point 163. The angle Φ is a viewing angle when the measurement point 163 is viewed from the cameras 1 and 2. The effective baseline length 167 is the length of a line segment 167a among line segments orthogonal to a straight line 168 as a bisector of the viewing angle Φ, the line segment 167a having one of end points at the projection center 162 of the camera 2 and the other end point on the straight line 164a. In other words, the effective baseline length 167 is the distance between the projection center 162 and a point at which a perpendicular line from the projection center 162 of the camera 2 to the bisector 168 intersects with the straight line 164a. The straight line 168 is a perpendicular bisector of the line segment 167a. The effective baseline length may be the length of a line segment 169a parallel to the line segment 167a. The line segment 169a has one of end points at the projection center 161 of the camera 1 and the other end point on the straight line 165a. An effective baseline length 169 as the length of the line segment 169a corresponds to the apparent distance between the cameras 1 and 2 when the cameras are viewed from the measurement point 163.

The effective baseline length 167 is the length of a subtense passing through the projection center 162 of the camera 2 in a fan shape having a central angle of the viewing angle Φ. The effective baseline length 169 is the length of a subtense passing through the projection center 161 of the camera 1 in a fan shape having a central angle of the viewing angle Φ. In this manner, the effective baseline length is the width of an inside region of the viewing angle Φ in the direction of a subtense of a fan shape having the central angle Φ at the projection center 161 or 162 of the camera 1 or 2. The inside region of the viewing angle Φ is an inside region of the sight lines 164 and 165.

The effective baseline length is not limited to the effective baseline lengths 167 and 169. For example, the effective baseline length may be any subtense of a fan shape having a central angle of the viewing angle Φ. For example, the effective baseline length may be the length of any line segment that is parallel to the line segments 167a and 169a and has both ends on the straight lines 164a and 165a. Such a line segment corresponding to the effective baseline length may be positioned between the line segments 167a and 169a.

Alternatively, the effective baseline length may be the viewing angle Φ, which is the internal angle of the straight lines 164a and 165a. The viewing angle Φ behaves similarly to the effective baseline length and is correlated therewith. Accordingly, change of the effective baseline length can be represented by change of the viewing angle Φ, and has one-on-one correspondence to the change of the effective baseline length. Specifically, the effective baseline length is larger as the viewing angle Φ is larger, and the effective baseline length is smaller as the viewing angle Φ is smaller. The effective baseline length can be calculated based on the viewing angle Φ and the distance between the measurement point 163 and the projection center 161 or 162.

For a calibrated camera, the direction of the sight line (in other words, a vector in the direction of the sight line) of the camera can be calculated from a coordinate value in a camera image based on the relation represented by Equation 2 above. Specifically, when, in Equation 2, a coordinate set (x, y, z) of a measurement point in the viewpoint coordinate system of the camera 1 is (Xi, Yi, Zi), a coordinate pair (u, v) of an image of the measurement point on a camera image obtained by the camera 1 capturing an object including the measurement point is (x1, y1), and the coordinate pair (u, v) of an image of the measurement point in a camera image obtained by the camera 2 capturing the object including the measurement point is (x2, y2), a sight line vector (a1, b1, c1) from a coordinate pair (x1, y1) to a coordinate set (Xi, Yi, Zi) is calculated as follows.

When φ1 represents the azimuth angle of the measurement point (Xi, Yi, Zi) in the image of the camera 1, $\varphi 1 = \tan^{-1}(v1/u1)$ from $\tan \varphi 1 = v1/u1$. When θ1 represents the elevation angle thereof from an imaging plane, $\theta 1 = k1(\sqrt{(u1^2+u1^2)})/f1$ from Equation 2. Accordingly, the following formula is obtained from these relations and $\tan \theta 1 = (\sqrt{(X1^2+Y1^2)})/Z1$:

$$\begin{pmatrix} a_1 \\ b_1 \\ c_1 \end{pmatrix} = \begin{pmatrix} \dfrac{\cos\phi_1 \tan\theta_1}{1+\tan\theta_1} \\ \dfrac{\sin\phi_1 \tan\theta_1}{1+\tan\theta_1} \\ \dfrac{1}{1+\tan\theta_1} \end{pmatrix}$$

When the coordinate set of the measurement point in the viewpoint coordinate system of the camera 2 is (X2, Y2, Z2), a sight line vector (a2, b2, c2) from a coordinate pair (x2, y2) to a coordinate set (Xi, Yi, Zi) can be calculated as follows. (coordinate sets (Xi, Yi, Zi) and (X2, Y2, Z2) represent a physically identical point in different coordinate systems.)

When φ2 represents the azimuth angle of the measurement point (X2, Y2, Z2) on the image of the camera 2, and θ2 represents the elevation angle thereof from the imaging plane, a sight line vector calculated in a manner same as that for the camera 1 is multiplied by rotational components (components represented by r00 to r22 in Equation 1) of a conversion matrix M21 from the coordinate system of the camera 2 to the coordinate system of the camera 1, thereby obtaining the following formula.

$$\begin{pmatrix} a_2 \\ b_2 \\ c_2 \end{pmatrix} = \begin{pmatrix} r_{00} & r_{01} & r_{02} \\ r_{10} & r_{11} & r_{12} \\ r_{20} & r_{21} & r_{22} \end{pmatrix} \begin{pmatrix} \dfrac{\cos\phi_2 \tan\theta_2}{1+\tan\theta_2} \\ \dfrac{\sin\phi_2 \tan\theta_2}{1+\tan\theta_2} \\ \dfrac{1}{1+\tan\theta_2} \end{pmatrix}$$

As described above, a straight line in the direction of a sight line connecting the projection center of a camera and an object can be uniquely calculated in the three-dimensional space from a vector in the direction of the sight line and external parameters representing the position and posture of the camera. Thus, the three-dimensional position of the measurement point 163 is calculated as an intersection point of the straight lines 164a and 165a in the directions of the two sight lines 164 and 165 from coordinate values on the images of the cameras 1 and 2.

The two straight lines 164a and 165a in the directions of sight lines do not precisely intersect with each other in some cases due to error in association between the camera images and quantization error. Thus, in actual position calculation of the measurement point 163, the three-dimensional position of the measurement point 163 is calculated as a point equidistant from the two straight lines 164a and 165a in some cases. The points equidistant from the straight lines 164a and 165a may be middle points on lines to the straight lines from a perpendicular line common to the two straight lines 164a and 165a. Alternatively, the three-dimensional position of the measurement point 163 may be calculated to be as the position of an end point of a perpendicular line from the projection center of one of the cameras as a reference in the direction of the sight line of the camera. It will be described later that a pair of points on two straight lines, which minimize the distance therebetween are end points of a perpendicular line common to the straight lines.

The angle Φ between the two cameras 1 and 2 when viewed from the measurement point 163 in the directions of the two sight lines 164 and 165 is calculated from Equation 8 below. A vector from the camera 1 to (a1, b1, c1) is the directional vector of the sight line 164, in other words, the sight line vector thereof, and a vector from the camera 2 to (a2, b2, c2) is the sight line vector of the sight line 165.

$$\Phi = \cos^{-1}\left( \frac{a_1 a_2 + b_1 b_2 + c_1 c_2}{\sqrt{a_1^2 + b_1^2 + c_1^2} \sqrt{a_2^2 + b_2^2 + c_2^2}} \right) \quad (8)$$

When depth measurement is performed by triangulation under a condition of the effective baseline length $d_{eff}$, the depth from the position of one end of the effective baseline length (corresponding to the viewpoint of one of the cameras) to an apex (corresponding to the position of the object) is given by Equation 9 below. For example, in FIG. 13, the distance between the measurement point 163 and the projection center 162 of the camera 2 corresponds to the depth. When the error ΔΦ is superimposed on the angle Φ when viewed from the position of the viewpoint, an error $err_{depth}$ of the depth is given by Equation 10 below.

$$\text{depth} = \frac{d_{eff}}{2\sin\dfrac{\Phi}{2}} \approx \frac{d_{eff}}{\Phi} \quad (9)$$

-continued $$err_{depth} = \frac{d_{eff}}{\Phi + \Delta\Phi} - \frac{d_{eff}}{\Phi} = -\frac{\Delta\Phi d_{eff}}{\Phi(\Phi + \Delta\Phi)} = \quad (10)$$

$$-\frac{\alpha \dfrac{\varepsilon}{\left(\dfrac{\partial I}{\partial n}\right)} d_{eff}}{\dfrac{d_{eff}}{\text{depth}}\left(\dfrac{d_{eff}}{\text{depth}} + \alpha \dfrac{\varepsilon}{\left(\dfrac{\partial I}{\partial n}\right)}\right)} = -\frac{\alpha\varepsilon \text{depth}^2}{d_{eff}\left(\dfrac{\partial I}{\partial n}\right) + \alpha\varepsilon \text{depth}}$$

Figure 14:
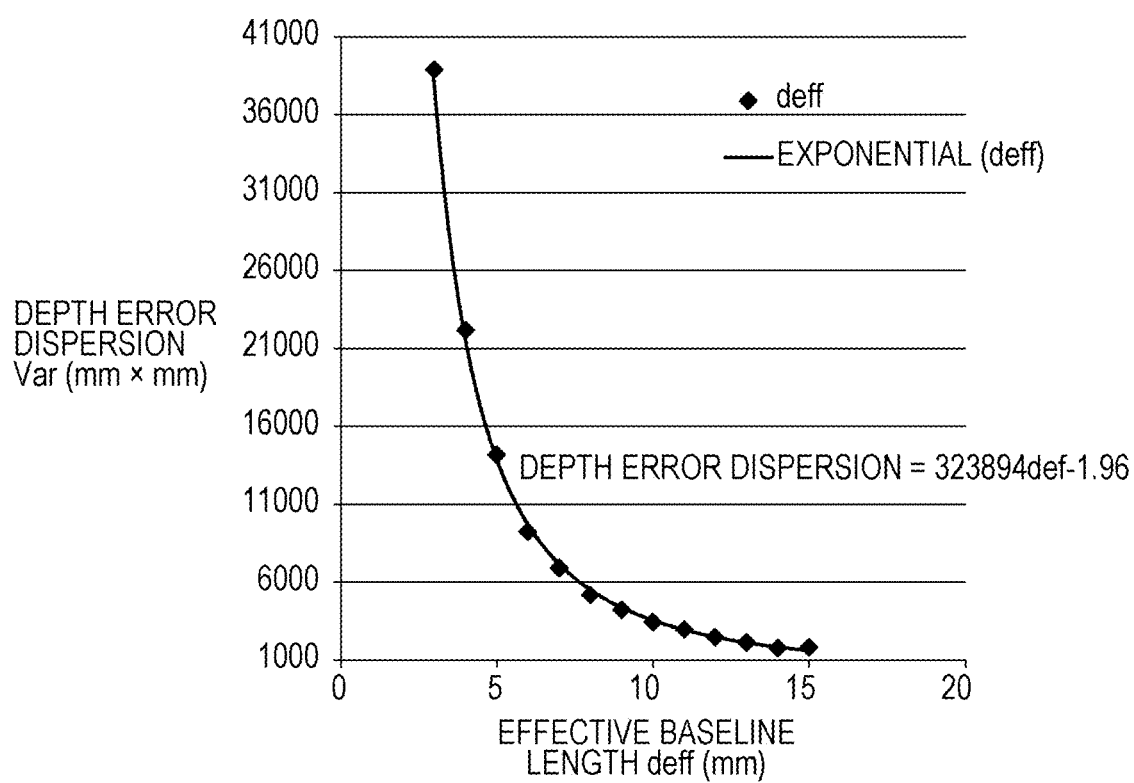
FIG. 14 is a diagram illustrating a relation between the effective baseline length and variance of depth measurement error.

In Equation 10 above, the error $err_{depth}$ of the depth is given by a fractional expression of noise (random variable ε), and thus variance of the error $err_{depth}$ cannot be analytically expressed, but can be numerically evaluated. FIG. 14 illustrates an example of the numerical evaluation. FIG. 14 illustrates variance of error in the depth with φ=1, ∂I/∂n=50, and a proportional constant α=0.03 for an object positioned distant from a camera by 1 m, in other words, positioned on a hemisphere having a radius of 1 m and covering a camera of interest. The condition "σ=1" means PSNR=20 log (255/1)=48.1 dB in an 8-bit image. In FIG. 14, the variance of error in the depth is substantially inversely proportional to the effective baseline length $d_{eff}$ to the power of two.

The mean and the variance can be calculated for weighted addition of random variables (in other words, a value with error; an acquired value of the depth, in this example) having different means and different variances. In a case of a four-eye camera, a camera of interest is included three stereo pairs as described above, and thus three depth measurement values are obtained. When an error xi in the three pieces of depth measurement data is taken to be a random variable as represented by Equation 11 below, a weighted sum of three random variables $x_1$, $x_2$, and $x_3$ can be calculated as indicated by Equation 12 below. In the equation, μi represents the mean of the error xi over correspondence points, and $\sigma i^2$ represents the variance of the error xi over the correspondence points.

$$x_i \sim N(\mu_i, \sigma_i^2) \, i=1,2,3 \quad (11)$$

$$\alpha x_1 + \beta x_2 + \gamma x_3 \sim N(\alpha\mu_1 + \beta\mu_2 + \gamma\mu_3, \alpha^2\sigma_1^2 + \gamma^2\sigma_3^2) \quad (12)$$

A depth measurement value can be obtained at an accuracy exceeding individual depth measurement accuracies by determining weights α, β, and γ so that variance of the weighted addition value is minimized. Such values of α, β, and γ are given by Equation 14 below based on a relation represented by Equation 13 below when the error means $\mu_1$, $\mu_2$, and $\mu_2$ are set to be zero for simplification.

$$\left. \begin{array}{l} \nabla \text{Var} = \nabla(\alpha^2\sigma_1^2 + \beta^2\sigma_2^2 + \gamma^2\sigma_3^2) = 0 \\ \alpha + \beta + \gamma = 1 \end{array} \right\} \quad (13)$$

$$\begin{pmatrix} \alpha \\ \beta \\ \gamma \end{pmatrix} = \frac{1}{\sigma_1^2\sigma_2^2 + \sigma_2^2\sigma_3^2 + \sigma_3^2\sigma_1^2} \begin{pmatrix} \sigma_2^2\sigma_3^2 \\ \sigma_3^2\sigma_1^2 \\ \sigma_1^2\sigma_2^2 \end{pmatrix} = \frac{1}{\dfrac{1}{\sigma_1^2} + \dfrac{1}{\sigma_2^2} + \dfrac{1}{\sigma_3^2}} \begin{pmatrix} \dfrac{1}{\sigma_1^2} \\ \dfrac{1}{\sigma_2^2} \\ \dfrac{1}{\sigma_3^2} \end{pmatrix} \quad (14)$$

As understood from the relation illustrated in FIG. 14, the variances of error in the depth in the three stereo pairs, in other words, $\sigma_1^2$, $\sigma_2^2$, and $\sigma_3^2$ are substantially inversely proportional to the effective baseline lengths $d_{eff1}$, $d_{eff2}$, and $d_{eff3}$ to the power of two of the corresponding stereo pairs. From this relation and a result of Equation 14, the values of coefficients of weighted integration, which are the weights α, β, and γ are given by Equation 15 below by using the effective baseline lengths at depth measurement with the individual stereo pairs.

$$\begin{pmatrix} \alpha \\ \beta \\ \gamma \end{pmatrix} = \frac{1}{d_{\mathit{eff}1}^2 + d_{\mathit{eff}2}^2 + d_{\mathit{eff}3}^2} \begin{pmatrix} d_{\mathit{eff}1}^2 \\ d_{\mathit{eff}2}^2 \\ d_{\mathit{eff}3}^2 \end{pmatrix} \quad (15)$$

From Equation 9 and FIG. 13, the angle (viewing angle) Φ of the cameras 1 and 2 when viewed from the measurement point 163 illustrated in FIG. 13 is proportional to the effective baseline length $d_{\mathit{eff}}$, and thus the same effect is obtained when the values of the weights α, β, and γ indicated in Equation 15 are expressed as Equation 16 below, which is included in the present disclosure.

$$\begin{pmatrix} \alpha \\ \beta \\ \gamma \end{pmatrix} = \frac{1}{\Phi_1^2 + \Phi_2^2 + \Phi_3^2} \begin{pmatrix} \Phi_1^2 \\ \Phi_2^2 \\ \Phi_3^2 \end{pmatrix} \quad (16)$$

Accordingly, a pair of the pixel coordinate value and the position information of the camera q of interest among cameras are expressed in Equation 17 below as the selected position integration information at the viewpoint of the camera of interest.

$$P_q'' = \{P_{qn}\}, (n = 1, \ldots, N_q) \quad (17)$$

$$= \{(u_{qn}, v_{qn}, x_{qn}, y_{qn}, z_{qn})\}$$

When having 2×2=4 eyes, the camera q of interest has any of a lower-left (LL) viewpoint, a lower-right (LR) viewpoint, an upper-left (UL) viewpoint, and an upper-right (UR) as illustrated in FIG. 12. When the camera q of interest is, for example, a camera 100a (lower-left viewpoint), the three-dimensional positions of correspondence points with minimized error variance in position information can be obtained by performing weighted addition in accordance with variance of error included in pieces of position information as indicated by Equation 18 or 19 below. In the weights α, β, and γ of the weighted addition, the effective baseline lengths to the power of two are used in place of error variances in Equation 18, and the viewing angles to the power of two are used in place of error variances in Equation 19. Thus, in Equations 18 and 19, the weighted addition is performed without using image noise levels and error variances of the three-dimensional position in stereo vision but by using the effective baseline lengths and the viewing angles corresponds thereto.

$$\begin{pmatrix} x_{an} \\ y_{an} \\ z_{an} \end{pmatrix} = \frac{1}{d_{\mathit{eff},(a-b)n}^2 + d_{\mathit{eff},(a-c)n}^2 + d_{\mathit{eff},(a-d)n}^2} \quad (18)$$

$$\begin{pmatrix} x_{(a-b)n} & x_{(a-c)n} & x_{(a-d)n} \\ y_{(a-b)n} & y_{(a-c)n} & y_{(a-d)n} \\ z_{(a-b)n} & z_{(a-c)n} & z_{(a-d)n} \end{pmatrix} \begin{pmatrix} d_{\mathit{eff},(a-b)n}^2 \\ d_{\mathit{eff},(a-c)n}^2 \\ d_{\mathit{eff},(a-d)n}^2 \end{pmatrix}$$

-continued $$\begin{pmatrix} x_{an} \\ y_{an} \\ z_{an} \end{pmatrix} = \quad (19)$$

$$\frac{1}{\Phi_{(a-b)n}^2 + \Phi_{(a-c)n}^2 + \Phi_{(a-d)n}^2} \begin{pmatrix} x_{(a-b)n} & x_{(a-c)n} & x_{(a-d)n} \\ y_{(a-b)n} & y_{(a-c)n} & y_{(a-d)n} \\ z_{(a-b)n} & z_{(a-c)n} & z_{(a-d)n} \end{pmatrix} \begin{pmatrix} \Phi_{(a-b)n}^2 \\ \Phi_{(a-c)n}^2 \\ \Phi_{(a-d)n}^2 \end{pmatrix}$$

In Equations 18 and 19, a coordinate set ($x_{an}$, $y_{an}$, $z_{an}$) represents the three-dimensional position of the measurement point, which means that an image obtained by the camera 101a capturing the measurement point is observed at the pixel coordinate pair (uan, van) on the camera image of the camera 101a. In Equations 18 and 19, a coordinate set ($x_{(a-b)n}$, $y_{(a-b)n}$, $z_{(a-b)n}$) is obtained by replacing, in Equation 4 above, q with a corresponding to the camera 101a and r with b corresponding to the camera 101b. Thus, the coordinate set ($x_{(a-b)n}$, $y_{(a-b)n}$, $z_{(a-b)n}$) represents a three-dimensional position calculated by stereo vision between the two camera images of the cameras 101a and 101b. Similarly, a coordinate set ($x_{(a-c)n}$, $y_{(a-c)n}$, $z_{(a-c)n}$) is obtained by replacing, in Equation 4 above, q with a corresponding to the camera 101a and r with c corresponding to the camera 101c. Similarly, a coordinate set ($x_{(a-d)n}$, $y_{(a-d)n}$, $z_{(a-d)n}$) is obtained by replacing, in Equation 4 above, q with a corresponding to the camera 101a and r with d corresponding to the camera 101d. The coordinate set ($x_{(a-c)n}$, $y_{(a-c)n}$, $z_{(a-c)n}$) represents the three-dimensional position by stereo vision between the two camera images of the cameras 101a and 101c. The coordinate set ($x_{(a-d)n}$, $y_{(a-d)n}$, $z_{(a-d)n}$) represents the three-dimensional position by stereo vision between the two camera images of the cameras 101a and 101d.

In Equation 18, $d_{\mathit{eff},(a-b)n}$ represents the effective baseline length when the position ($x_{(a-b)n}$, $y_{(a-b)n}$, $z_{(a-b)n}$) is triangulated with the cameras 101a and 101b. Similarly, $d_{\mathit{eff},(a-c)n}$ represents the effective baseline length when the position ($x_{(a-c)n}$, $y_{(a-c)n}$, $z_{(a-c)n}$) is triangulated with the cameras 101a and 101c, and $d_{\mathit{eff},(a-d)n}$ represents the effective baseline length when the position ($x_{(a-d)n}$, $y_{(a-d)n}$, $z_{(a-d)n}$) is triangulated with the cameras 101a and 101d.

In Equation 19, $\Phi_{(a-b)n}$ represents the viewing angle when the position ($x_{(a-b)n}$, $y_{(a-b)n}$, $z_{(a-b)n}$) is triangulated with the cameras 101a and 101b. Similarly, $\Phi_{(a-c)n}$ represents the viewing angle when the position ($x_{(a-c)n}$, $y_{(a-c)n}$, $z_{(a-c)n}$) is triangulated with the cameras 101a and 101c, and $\Phi_{(a-d)n}$ represents the viewing angle when the position ($x_{(a-d)n}$, $y_{(a-d)n}$, $z_{(a-d)n}$) is triangulated with the cameras 101a and 101d.

The three-dimensional coordinate set ($x_{an}$, $y_{an}$, $z_{an}$) corresponding to the pixel coordinate pair (uan, van) for the camera 101a is calculated from Equation 18 or 19 by using the three-dimensional position by stereo vision in each of the image pairs (Ia, Ib), (Ia, Ic), and (Ia, Id) of the three camera pairs 101a-101b, 101a-101c, and 101a-101d formed by the cameras 101a to 101d when the camera 101a is a reference.

Equation 18 calculates a coordinate set ($x_{an}$, $y_{an}$, $z_{an}$) by adding weight values using the effective baseline lengths to the coordinate values of a three-dimensional coordinate set based on a pair of camera images by a camera pair. For example, the x coordinate value of the three-dimensional coordinate set based on the camera image pair Ia and Ib is multiplied by a weight value using the effective baseline length, the x coordinate value of the three-dimensional coordinate set based on the camera image pair Ia and Ic is multiplied by a weight value using the effective baseline length, and the x coordinate value of the three-dimensional coordinate set based on the camera image pair Ia and Id is multiplied by a weight value using the effective baseline length, and these three products are added together to calculate $x_{an}$. As indicated in Equation 15 above, an added weight is obtained by dividing each effective baseline length to the power of two by the sum of the effective baseline lengths to the power of two, in other words, (the effective baseline length to the power of two)/(the sum of the effective baseline lengths to the power of two). Such a weight is a normalized value of the effective baseline length to the power of two, and the sum of the weights is one.

Equation 19 calculates a coordinate set ($x_{an}$, $y_{an}$, $z_{an}$) by adding weight values using the viewing angles to the coordinate values of the three-dimensional coordinate set based on a pair of camera images of a camera pair. For example, the x coordinate value of the three-dimensional coordinate set based on the camera image pair Ia and Ib is multiplied by a weight value using the viewing angle, the x coordinate value of the three-dimensional coordinate set based on the camera image pair Ia and Ic is multiplied by a weight value using the viewing angle, the x coordinate value of the three-dimensional coordinate set based on the camera image pair Ia and Id is multiplied by a weight value using the viewing angle, and three products are added together to calculate $x_{an}$. As indicated in Equation 16 above, an added weight is obtained by dividing each viewing angle to the power of two by the sum of the viewing angles to the power of two, in other words, (the viewing angle to the power of two)/(the sum of the viewing angles to the power of two). Such a weight is a normalized value of the viewing angle to the power of two, and the sum of the weights is one.

Figure 15:
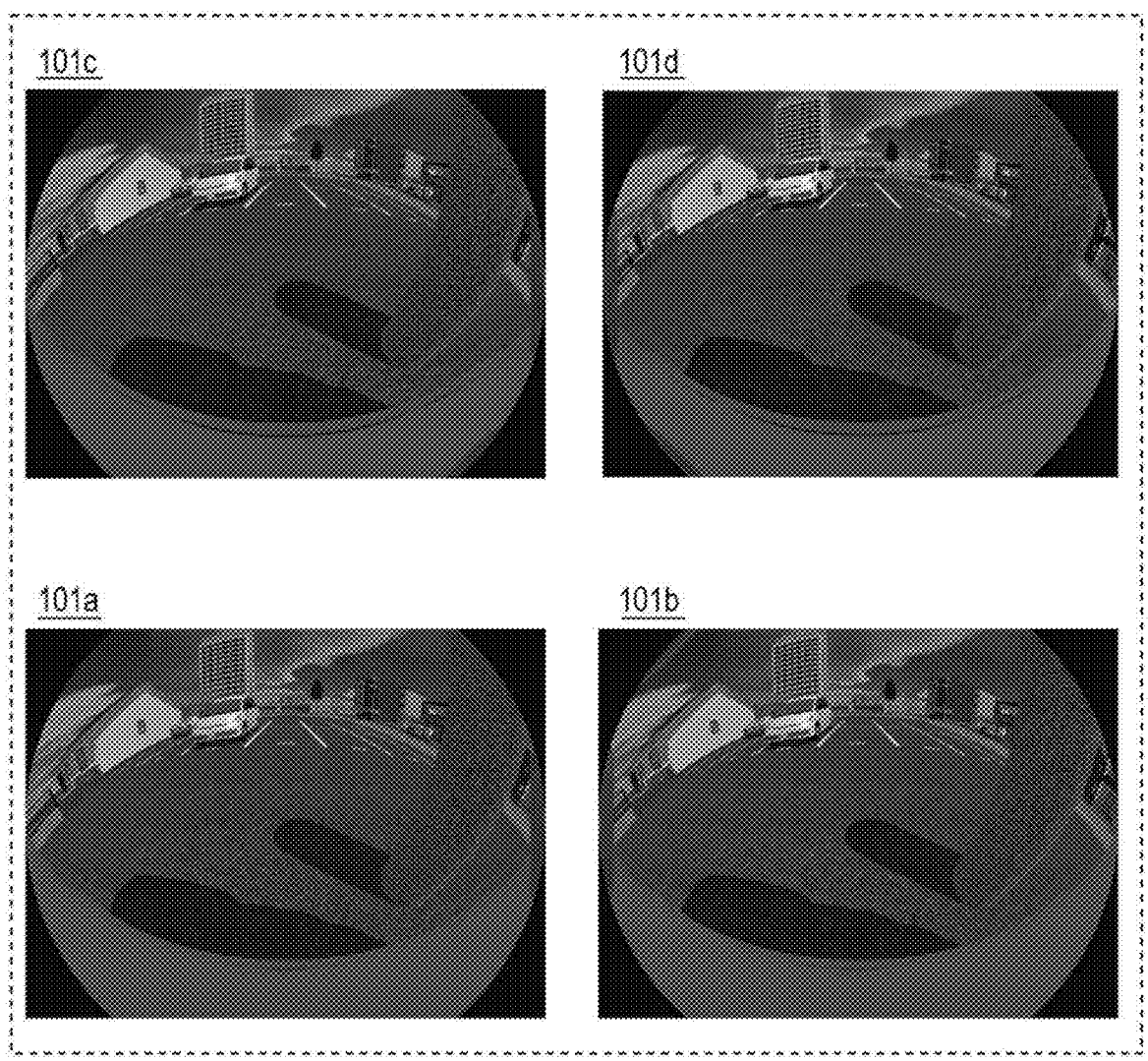
FIG. 15 is a diagram illustrating exemplary four-lens images captured by the four-lens camera.
Figure 16:
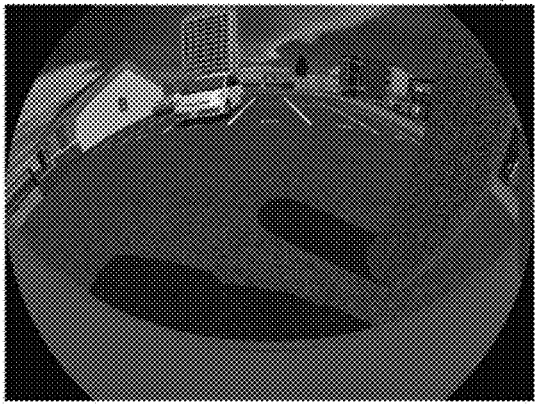
FIG. 16 is a diagram illustrating exemplary evaluation images.
Figure 16:
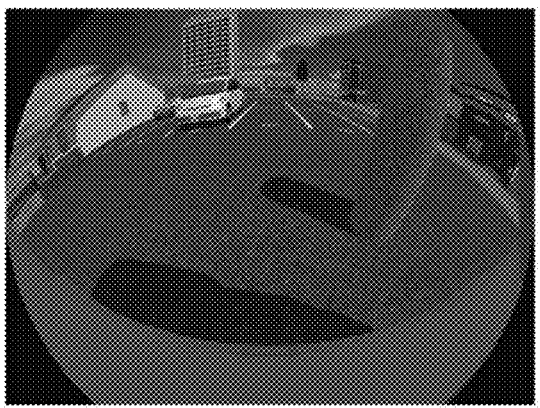
Figure 16:
Figure 16:
Figure 16:
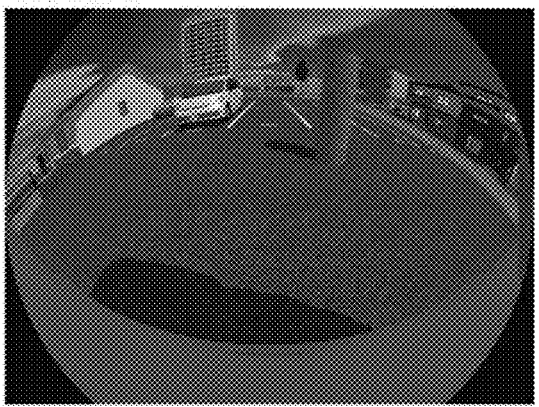
Figure 16:
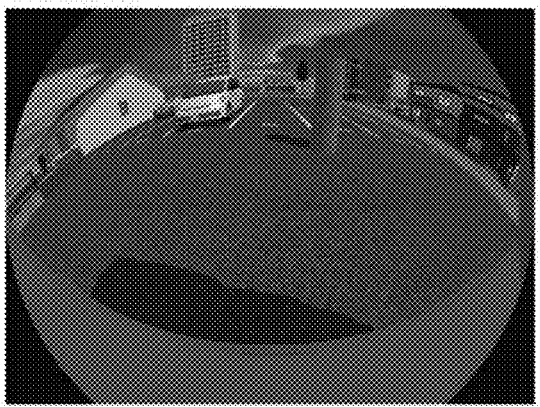
Figure 17:
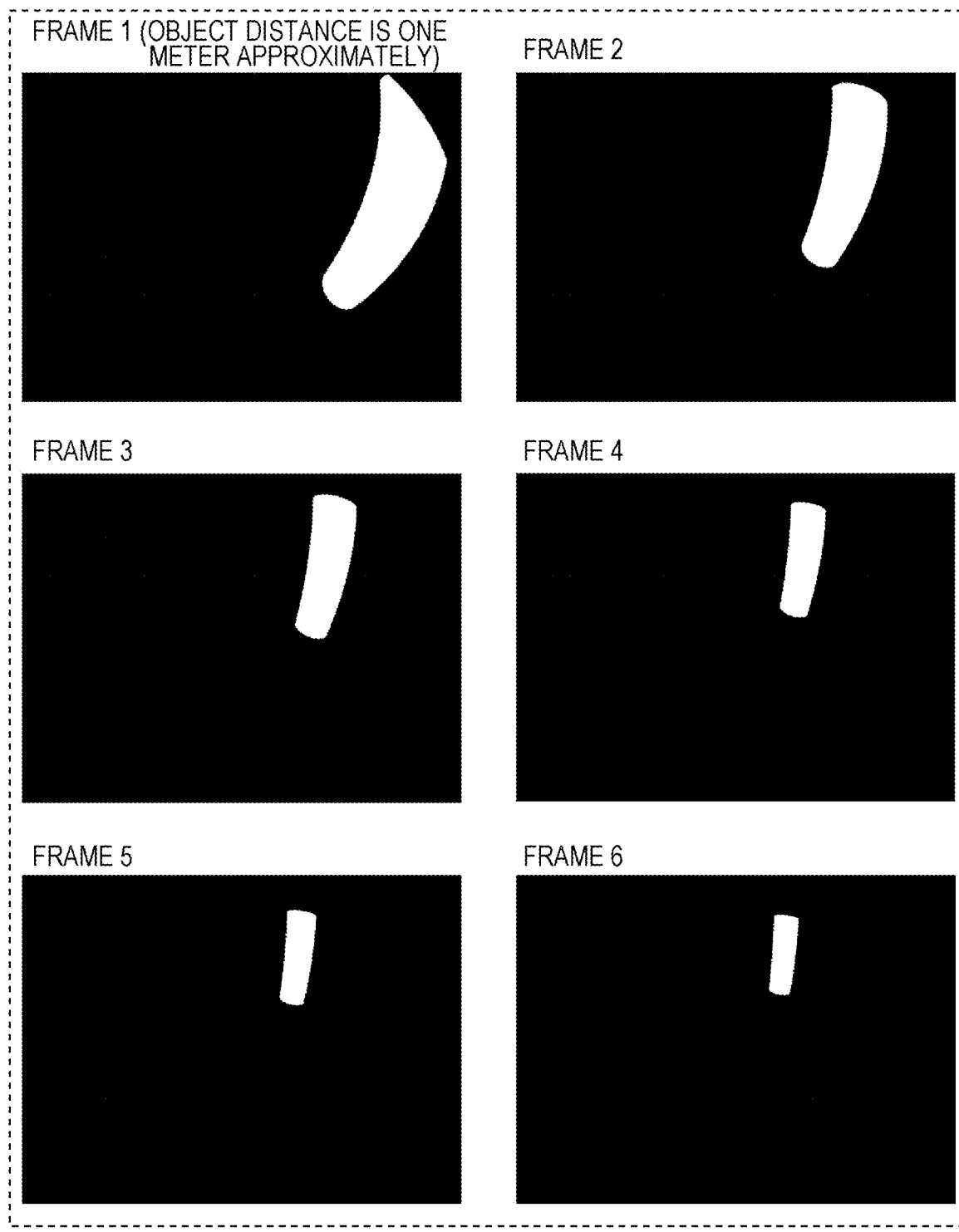
FIG. 17 is a diagram for description of an evaluation region of a relative RMS error as depth measurement error.

FIGS. 15 to 17 illustrate exemplary integration of position information by the above-described method. FIG. 15 illustrates exemplary stereo images by the image capturing unit 100 including a four-fish-eye lens. FIG. 15 illustrates camera images of the cameras 101*a* to 101*b*. FIG. 16 illustrates the camera image of the camera 101*a* used to integrate position information, and the position of a pole in the camera image differs between frames. FIG. 16 illustrates the camera image of six frames, and the distance between the pole in an object and the image capturing unit 100 differs between the six frames. Specifically, the distance increases from Frame 1 to Frame 6. FIG. 17 is a diagram illustrating places at which position integration is evaluated in an evaluation image. In FIG. 17, comparison of the position information integration method can be performed for a white region (region with no color nor pattern) in each frame, in other words, a region including the pole based on the difference between the three-dimensional position of the pole prepared at CG production and the three-dimensional position of the pole calculated by triangulation. Frames 1 to 6 illustrated in FIG. 17 correspond to Frames 1 to 6 illustrated in FIG. 16, respectively.

Error in position information is evaluated by using a depth value "deptha" to a position indicated by position information when viewed from each pixel of a camera (in this example, the camera 101*a*) having a viewpoint of interest. The depth value "depthan" and the position information ($x_{an}$, $y_{an}$, $z_{an}$) have a relation expressed by Equation 20 below.

$$depth_{an} = \sqrt{x_{an}^2 + y_{an}^2 + z_{an}^2}$$

The above description with Equations 11 to 15 is made on the integration method when no occlusion occurs in all stereo pairs, in other words, image pairs. However, when occlusion occurs to a stereo pair, weighted integration of depth measurement values by the remaining two stereo pairs is performed and an integration value is output as selected position integration information. When occlusion occurs to two stereo pairs, a depth measurement value by the remaining stereo pair is output as selection position integration value. Accordingly, selection integration of depth measurement values can be performed without influence of occlusion.

Figures 18, 19:
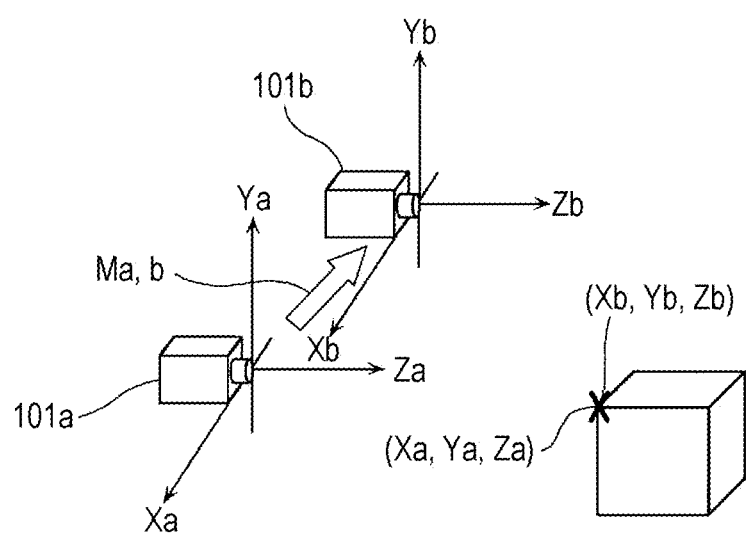
FIG. 18 is a diagram comparing the relative RMS errors as the depth measurement errors.
FIG. 19 is a diagram illustrating exemplary coordinate systems of cameras and exemplary external parameters of the cameras.

FIG. 18 illustrates comparison of errors (also referred to as relative RMS errors) in depth measurement. Each relative RMS error in FIG. 18 is calculated from error in depth measurement in the evaluation region including the pole in FIG. 17 for each of the six frames of the camera image illustrated in FIG. 16. The results illustrated in FIG. 18 indicate that the accuracy of depth measurement differs for an identical object depending on a camera pair with which triangulation is performed. Error in depth measurement is reduced by integration methods disclosed in Patent Literature 1 and Patent Literature 2, but is not lower than error in depth measurement with the best stereo pair (101*a*-101*b*) among the three stereo pairs. However, in the integration method according to the present embodiment that performs weighting with the effective baseline length to the minus two, the position information integration is achieved with depth measurement error lower than the error in depth measurement with the best stereo pair (101*a*-101*b*).

In this manner, at step S403, the position selection integration unit 112 selects the position information of an unoccluded region based on the occlusion information, generates selected position integration information P'total={P'a,b, P'a,c, P'a,d, P'b,c, P'b,d, P'c,d}, and generates selected position integration information P"q at the viewpoint of a camera of interest by calculating the weighted sum of the selected position information based on the effective baseline length.

Subsequently at step S404, the image complement unit 113 acquires camera images captured by the cameras 101*a* to 101*d* of the image capturing unit 100, the occlusion information read at step S401, the internal and external parameters of the cameras 101*a* to 101*d*, the selected position integration information P'total generated at step S403, and the selected position integration information P"q at the viewpoint of the camera of interest. In addition, the image complement unit 113 generates a complement image by replacing, based on the selected position integration information, the pixel value of a pixel in any occluded region in each camera image with a value based on the pixel value of a pixel of any other image, and outputs the complement image and the selected position integration information P"q at the viewpoint of the camera of interest.

The following describes the processing at step S404 in detail. The present embodiment describes a case in which the pixel value of a pixel in any occluded region in the image Ia is complemented by using the other three images Ib, Ic, and Id and the selected position integration information P'total={P'a,b, P'a,c, P'a,d, P'b,c, P'b,d}, At step S404, the image complement unit 113 first calculates a pixel coordinate pair (ua, va) on the image Ia for all position information of the selected position integration information P'total. The pixel coordinate pair on the image Ia calculated by using the selected position integration information P'total={P'a,b, P'a,c, P'a,d, P'b,c, P'b,d, P'c,d} can be associated with the occlusion information.

Pixel coordinate pairs on the image Ia are calculated by a method as follows. The three-dimensional position (xa, ya, za) of an object at each pixel of the image Ia in the coordinate system of the camera 101a is calculated by using the three-dimensional position (xq, yq, zq) in the coordinate system of the camera q corresponding to the cameras 101b, 101c, and 101d, which is included in the selected position integration information P'total, and external parameters Mq,a of the camera 101a and the camera q. FIG. 19 illustrates the relation between coordinate systems XaYaZa and XbYbZb of the cameras 101a and 101b and external parameters Ma,b of the cameras. Then, the pixel coordinate pair (ua, va) of the camera 101a can be calculated based on Equation 21 below by using the three-dimensional position (xa, ya, za) and the internal parameters (f, k) of the camera 101a. Accordingly, a depth value in an occluded region at the viewpoint of the camera 101a is generated, and information of the depth value in the occluded region (ua, va) is added to selected position integration information P'''a at a viewpoint of interest.

A depth image in an occluded region of the camera 101a can be generated by the above-described method because, as described above, only a three-dimensional position visible in an "object region" in each image of a stereo camera pair is selected as a three-dimensional position included in the selected position information P'total={P'a,b, P'a,c, P'a,d, P'b,c, P'b,d, P'c,d} and thus the three-dimensional position (ua,va) calculated to be at a pixel position in an "occluded region" of the camera 101a among the three-dimensional positions included in the selected position information P'total={P'a,b, P'a,c, P'a,d, P'b,c, P'b,d, P'c,d} is the three-dimensional position calculated by a camera pair not including the camera 101a.

Although the method of projecting a three-dimensional position to a two-dimensional image of the camera 101a is described above for simplification, accuracy improvement with the weighted addition using the effective baseline length, which is performed in an object region, may be performed when a three-dimensional position included in the selected position integration information P'total is projected to an identical pixel in an occluded region of the camera 101a plural times.

$$u_a = \frac{1}{k} \frac{x_a}{\sqrt{x_a^2 + y_a^2}} f \tan^{-1} \frac{\sqrt{x_a^2 + y_a^2}}{z_a}$$
$$v_a = \frac{1}{k} \frac{y_a}{\sqrt{x_a^2 + y_a^2}} f \tan^{-1} \frac{\sqrt{x_a^2 + y_a^2}}{z_a}$$
$$\begin{pmatrix} x_a \\ y_a \\ z_a \\ 1 \end{pmatrix} = M_{q,a} \begin{pmatrix} x_q \\ y_q \\ z_q \\ 1 \end{pmatrix}$$
(21)

Subsequently at step S404, the image complement unit 113 extracts, from among all pixels of the image Ia, a coordinate pair (u, v) of a pixel the occlusion information Oa (u, v) of which is in an "occluded region". The pixel is referred to as an occlusion pixel oaj=(uaj, vaj). Subsequently, for each occlusion pixel, the image complement unit 113 selects, from the selected position integration information P'total obtained in advance, position information of a correspondence point for which the pixel coordinate pair (ua, va) of the camera 101a and the pixel coordinate pair (uaj, vaj) of the occlusion pixel on the image are nearest to each other. Then, the image complement unit 113 calculates, for the two images Iq and Ir associated with each other through the selected correspondence point, the pixel value of the correspondence point from the pixel values iq (uqn, vqn) and ir (urn, vrn) of the correspondence point on the images Iq and Ir, and sets the pixel value to be the pixel value of the occlusion pixel having the pixel coordinate pair (uaj, vaj) on the image Ia. In this example, a method of calculating an average pixel value is employed as a method of calculating one pixel value from the pixel values iq (uqn, vqn) and ir (urn, vrn) of the correspondence point on the two images Iq and Ir. In addition, the image complement unit 113 repeats the above-described processing for all occlusion pixels, and sets new pixel values to all pixels in the occluded region on the image Ia. A complement image is generated by the above-described detailed image complement operation at step S404. The pixel value of a pixel not included in the occluded region is not changed for use.

Figure 20A:
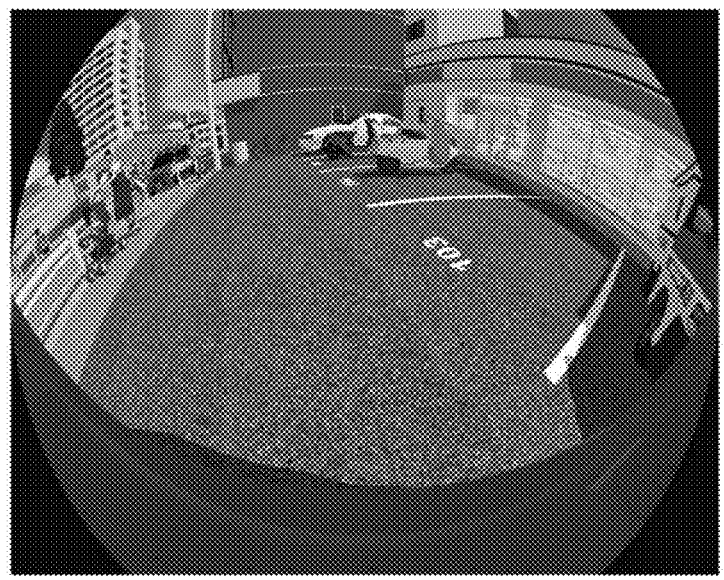
FIG. 20A is a schematic view illustrating an exemplary complement image according to the embodiment.
Figure 20B:
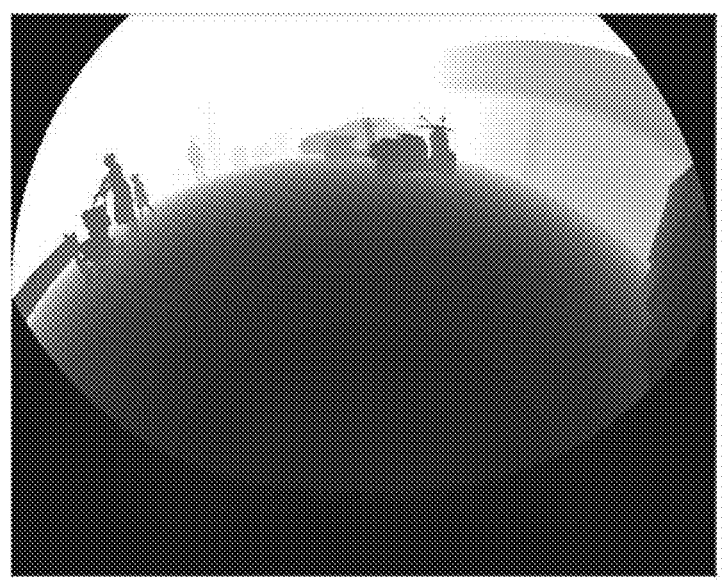
FIG. 20B is a schematic view illustrating exemplary selected position integration information according to the embodiment.

FIGS. 20A and 20B illustrate an exemplary complement image and exemplary selected integration position information P'''q at the viewpoint of a camera of interest, respectively. FIG. 20A illustrates an image generated by replacing, among the camera images of the "camera 101a" in FIG. 9A, an occluded region due to an adjacent lens or the like with a pixel value of another image by using the selected position integration information. In each camera image illustrated in FIG. 9B, a large part of the vehicle at the right end is occluded, but the vehicle is not occluded in the complement image illustrated in FIG. 20A. FIG. 20B illustrates a gray-scale image obtained by calculating, from the selected position integration information P'''a at the viewpoint of the camera 101a, a pixel coordinate value on the image Ia and a intensity value that is proportional to the distance between a three-dimensional point corresponding to each pixel coordinate value and the camera 101a.

In this manner, at step S404, the image complement unit 113 determines the pixel value of a pixel in an occluded region on a reference image based on the selected position integration information P'total={P'a,b, P'a,c, P'a,d, P'b,c, P'b,d, P'c,d} and another image, and generates a complement image in which the occluded region is complemented.

Lastly at step S405, the obstacle detection unit 120 acquires the complement image and the selected position integration information, detects a three-dimensional object such as an obstacle based on the selected position integration information, and outputs a composite image obtained by combining a frame indicating a gaze region in a superimposing manner in a region on the complement image, which corresponds to the position of the detected three-dimensional object.

In the present embodiment, a method of detecting, as a point on the obstacle, each three-dimensional position (xa, ya, za) of an object of the selected integration position information when a depth d between the three-dimensional position (xa, ya, za) and the camera 101a is smaller than a predetermined depth dth is employed as a method of detecting an obstacle based on the selected integration position information. In addition, a circumscribed rectangle on an aggregation of points detected as the obstacle is superimposed on the complement image, output as the composite image, and displayed on the display 130.

In this manner, at step S405, when a three-dimensional object such as an obstacle exists at a position closer than a predetermined threshold, the obstacle detection unit 120 generates a composite image on which a figure inviting attention is superimposed in a corresponding region on the complement image, and outputs the generate image to the display 130.

Through the above-described processing at steps S401 to S405 executed at the computer 300, one complement image and selected position integration information at the viewpoint of a camera of interest are generated from four camera images captured by the image capturing unit 100 by the image processing unit 110 and output, and one composite image is generated from the four camera images by the obstacle detection unit 120 and output. In addition, the image capturing unit 100 and the computer 300 may repeat the above-described operation.

Figure 21:
FIG. 21 is a schematic view illustrating an exemplary composite image output from an obstacle detection unit according to the embodiment.

FIG. 21 illustrates an exemplary composite image generated at step S405. In FIG. 21, a frame inviting attention is displayed on each obstacle (in this example, a pedestrian and a stopping vehicle) positioned close to a camera on the rear side of the vehicle body of the automobile, which allows the driver to recognize the existence of any obstacle at a high risk of contact. In particular, the image capturing apparatus 1 according to the present embodiment can acquire, for example, an image without occlusion in 180° and a three-dimensional position corresponding to the image for a region for which an image and a three-dimensional position corresponding to the image cannot be acquired due to occlusion by a camera body in a three-dimensional position calculation method using a fish-eye camera of the related art. For example, a partial region of a vehicle on the right side in the image of the "camera 101a" in FIG. 9B is occluded by a lens. However, as illustrated in FIG. 20A, the image capturing apparatus 1 can acquire an image without an occluded region in 180° and a three-dimensional position corresponding to the image. In addition, the image capturing apparatus 1 can display a composite image without an occluded region as illustrated in FIG. 21.

As described above, noise in a camera image can cause matching error at matching of correspondence points between camera images. Then, the matching error generates angle error at triangulation, and generates error in a three-dimensional position specified by stereo vision with cameras. The image capturing apparatus 1 according to the embodiment estimates variance of error in a three-dimensional position in stereo vision based on noise distribution, and calculates the weighted addition of three-dimensional positions measured by stereo pairs and containing error with weights using the effective baseline length or the viewing angle so that the variance is minimized, thereby minimizing the error in the three-dimensional position. The noise level of an image can be estimated from the image when a signal is uniform, but the estimation is difficult when the signal is changing. However, the effective baseline length and the viewing angle can be uniquely and easily calculated from association between images by stereo matching for a calibrated camera for which pixel coordinate pairs and the direction of a sight line viewed from the camera are associated with each other in advance.

[Others]

The image capturing apparatus and the like according to one or more aspects of the present disclosure are described above based on the embodiment, but the present disclosure is not limited to the embodiment. Various modifications thought of by the skilled person in the art and applied to the present embodiment, and an embodiment established by combining components of different embodiments may be included in the range of the one or more aspects of the present disclosure without departing from the scope of the present disclosure.

For example, in the image capturing apparatus 1 according to the embodiment, the image capturing unit 100 includes the four the cameras 101a to 101d, but the number of cameras is not limited to four. Complement of occlusion due to a camera included in an image of another camera only requires at least three cameras, and thus any number equal to or more than three of cameras may be provided.

In the image capturing apparatus 1 according to the embodiment, when the pixel value of a pixel included in one of cameras included in the image capturing apparatus 1 indicates a value of an image of obtained by capturing part of the camera, the pixel may be included in an occluded region.

In the image capturing apparatus 1 according to the embodiment, the processing at steps S402 to S404 is sequentially performed by receiving inputs from pairs of camera images. However, the amount of data handled by the processing at steps S402 to S404 at once is not limited to that of each pair of camera images. The processing at steps S402 to S404 may be repeated for each partial region or each pixel in a camera image.

In the image capturing apparatus 1 according to the embodiment, at step S404, the pixel value of a pixel at a correspondence point nearest to a pixel included in an occluded region is used in a method of complementing the pixel value of a pixel included in an occluded region with a pixel value of another image, but the present disclosure is not limited to this method. Any method of setting the pixel value of a pixel of an occluded region based on the pixel value of a pixel of an image not included in the occluded region by using information of a correspondence point included in selected position integration information is applicable. For example, a method of performing weighted addition of pixel values with reference to pixels on an image not included in an occluded region and the pixel values thereof based on correspondence points within a certain depth from a pixel of the occluded region is applicable.

In the image capturing apparatus 1 according to the embodiment, three-dimensional positions are calculated by detecting correspondence points for pixels at step S402, and then a pixel not included in an occluded region among the pixels is selected at step S403. However, the procedure of selecting a pixel not included in an occluded region is not limited to the above-described procedure. Any procedure capable of selecting a pixel not included in an occluded region is applicable. For example, in place of the procedure of selecting a pixel not included in an occluded region after calculation of position coordinate pairs of pixels, a pixel not included in an occluded region may be selected by using occlusion information, and thereafter, detection of a correspondence point and calculation of the three-dimensional position thereof may be performed for the selected pixel. This procedure performs the correspondence point detection and the three-dimensional position calculation for a smaller number of pixels than in the procedure described in the embodiment, which leads to reduction of the amount of calculation.

The image capturing apparatus 1 according to the embodiment is mounted on an automobile, but not limited thereto. The image capturing apparatus 1 is applicable to any usage that an object and the three-dimensional position of the object are measured with cameras. For example, the image capturing apparatus 1 may be mounted on any moving object other than an automobile and on a fixed object such as a monitoring camera.

As described above, the technology of the present disclosure may be achieved by a system, a device, a method, an integrated circuit, a computer program, or a recording medium such as a computer-readable recording disk, or may be achieved by an optional combination of the system, the device, the method, the integrated circuit, the computer program, and the recording medium. The computer-readable recording medium includes a non-transitory recording medium such as a CD-ROM.

For example, each component included in the above-described image capturing apparatus according to the embodiment is typically achieved by a large scale integration (LSI) as an integrated circuit. These components may be achieved by individual single chips, or some or all of the components may be achieved by a single chip.

The integration is not limited to an LSI but may be achieved by a dedicated circuit or a general-purpose processor. The integration may be achieved by a field programmable gate array (FPGA) that is programmable after LSI manufacturing, or a reconfigurable processor that allows reconfiguration of connection and/or setting of circuit cells inside an LSI.

In the above-described embodiment, each component may be achieved by dedicated hardware or may be achieved by executing a software program suitable for the component. As illustrated in FIG. 6, each component may be achieved by a computer program execution unit, such as a central processing unit (CPU) or a processor, reading and executing a software program recorded in a recording medium such as a hard disk or a semiconductor memory.

Some or all of the above-described components may be achieved by a detachable integrated circuit (IC) card or a single module. The IC card or the module is a computer system including a micro processor, a ROM, and a RAM. The IC card and the module may include the above-described LSI or system LSI. The IC card or the module achieves a function thereof through operation of the micro processor according to a computer program. The IC card and the module may be tamper resistant.

An image processing method according to the present disclosure may be achieved by a circuit such as a micro processing unit (MPU), a CPU, a processor, or an LSI, an IC card, or a single module.

The technology of the present disclosure may be achieved by a software program or a digital signal made of the software program, or may be achieved by a non-transitory computer-readable recording medium storing a computer program. The computer program may be distributed through a transmission medium such as the Internet.

Numbers such as ordinal numbers and quantities used in the above description are all examples for specific description of the technology of the present disclosure, and the present disclosure is not limited to those exemplary numbers. Any connection relation between components is an example for specific description of the technology of the present disclosure, and a connection relation that achieves a function of the present disclosure is not limited thereto.

Division of functional blocks in a block diagram is exemplary. The functional blocks may be achieved as one functional block, one of the functional blocks may be divided into functional blocks, or some function may be moved to another functional block. Functions of functional blocks having similar functions may be processed by a single piece of hardware or software in parallel or in a time divisional manner.

The following describes that a pair of points on two straight lines, which minimize the distance therebetween are end points of a perpendicular line common to the straight lines.

A straight line 1 is defined to be:

$$\frac{X - X_1}{a_1} = \frac{Y - Y_1}{b_1} = \frac{Z - Z_1}{c_1} = s$$

A straight line 2 is defined to be:

$$\frac{X - X_2}{a_2} = \frac{Y - Y_2}{b_2} = \frac{Z - Z_2}{c_2} = t$$

The position of the camera 1 is represented by:
$(X_1, Y_1, Z_1)$
The position of the camera 2 is represented by:
$(X_2, Y_2, Z_2)$
Unit directional vectors are given by:
$(a_1, b_1, c_1)$
and
$(a_2, b_2, c_2)$ In the above equations, s represents the depth from the camera 1, and t represents the depth from the camera 2.

The cameras 1 and 2 are calibrated in advance so that the values of the unit directional vectors
$(a_1, b_1, c_1)$
and
$(a_2, b_2, c_2)$
are uniquely determined for optional pixel coordinate values (x, y) in images of the cameras 1 and 2 (in other words, calibration is performed in advance to determine which direction each pixel corresponds to).

A point on the straight line 1 is expressed by:

$(X_1+sa_1, Y_1+sb_{b1}, Z_1+sc_1)$

A point on the straight line 2 is expressed by:

$(X_2+ta_2, Y_2+tb_2, Z_2+tc_2)$

The square J of the distance between the point on the straight line 1 and the point on the straight line 2 is given by:

$$J=((X_1sa_1)-(X_2+ta_2))^2+((Y_1+sb_1)-(Y_2-tb_2))^2+((Z_1+sc_1)-(Z_2+tc_2))^2$$

When disparity estimation is correctly performed without error, the straight line 1 and the straight line 2 normally intersect with each other at one point. However, when error is included in disparity estimation, the straight lines do not intersect with each other in some cases. In such a case, too, the depths from the cameras 1 and 2 can be obtained by calculating s and t that minimize the above-described J.

From:

$$\frac{\partial J}{\partial s} = 2(a_1((X_1+sa_1)-(X_2+ta_2))+$$
$$b_1((Y_1+sb_1)-(Y_2+tb_2))+c_1((Z_1+sc_1)-(Z_2+tc_2))) = 0$$

$$\frac{\partial J}{\partial t} = 2(a_2((X_1+sa_1)-(X_2+ta_2))+b_2((Y_1+sb_1)-(Y_2+tb_2))+$$
$$c_2((Z_1+sc_1)-(Z_2+tc_2))) = 0$$

the depths s and t that minimize the above-described J can be calculated to be:

$$\begin{pmatrix} s \\ t \end{pmatrix} =$$

-continued $$\begin{pmatrix} a_1^2+b_1^2+c_1^2 & -a_1a_2-b_1b_2-c_1c_2 \\ a_1a_2+b_1b_2+c_1c_2 & -a_2^2-b_2^2-c_2^2 \end{pmatrix}^{-1} \begin{pmatrix} a_1 & b_1 & c_1 \\ a_2 & b_2 & c_2 \end{pmatrix} \begin{pmatrix} X_2-X_1 \\ Y_2-Y_1 \\ Z_2-Z_1 \end{pmatrix}$$

by solving:

$$\begin{pmatrix} a_1^2+b_1^2+c_1^2 & -a_1a_2-b_1b_2-c_1c_2 \\ a_1a_2+b_1b_2+c_1c_2 & -a_2^2-b_2^2-c_2^2 \end{pmatrix} \begin{pmatrix} s \\ t \end{pmatrix} =$$

$$\begin{pmatrix} a_1 & b_1 & c_1 \\ a_2 & b_2 & c_2 \end{pmatrix} \begin{pmatrix} X_2-X_1 \\ Y_2-Y_1 \\ Z_2-Z_1 \end{pmatrix}$$

The inverse matrix in the above equation can be calculated except for:

$(a_1,b_1,c_1)=(a_2,b_2,c_2)$ in other words, except that the two straight lines are parallel to each other. When the two straight lines are parallel to each other, an object is assumed to be at infinity, thereby obtaining $s=\infty$ and $t=\infty$.

When the camera 1 is taken to be a reference for the depths s and t thus calculated, the depth s represents the distance from the position of the camera 1:

$(X_1, Y_1, Z_1)$

When the camera 2 is taken to be a reference, the depth t represents the distance from the position of the camera 2.

Instead of taking the camera 1 or the camera 2 to be a reference camera, the middle point between the above-described two points:

$$\left( \frac{(X_1+sa_1)+(X_2+ta_2)}{2}, \frac{(Y_1+sb_1)+(Y_2+tb_2)}{2}, \frac{(Z_1+sc_1)+(Z_2+tc_2)}{2} \right)$$

may be taken to be an intersection point of the two straight lines.

The meaning of the pair of points $(X_1+sa_1, Y_1+sb_{b1}, Z_1+sc_1)$, $(X_2+ta_2, Y_2+tb_2, Z_2+tc_2)$ that minimize the square J is as follows. The point $(X_1+sa_1, Y_1+sb_{b1}, Z_1+sc_1)$ is a point nearest to the straight line 2 among points on the straight line 1. The point $(X_2+ta_2, Y_2+tb_2, Z_2+tc_2)$ is, among points on the straight line 2, a point nearest to a point $(X_1+sa_1, Y_1+sb_{b1}, Z_1+sc_1)$ in other words, is an end point of a line perpendicular to the straight line 2 from the point $(X_1+sa_1, Y_1+sb_{b1}, Z_1+sc_1)$ The point $(X_2+ta_2, Y_2+tb_2, Z_2+tc_2)$ is a point nearest to the straight line 1 among points on the straight line 2. The point $(X_1+sa_1, Y_1+sb_{b1}, Z_1+sc_1)$ is, among points on the straight line 1, a point nearest to the point $(X_2+ta_2, Y_2+tb_2, Z_2+tc_2)$ in other words, is an end point of a line perpendicular to the straight line 1 from the point $(X_2+ta_2, Y_2+tb_2, Z_2+tc_2)$ Accordingly, a straight line passing through the two points $(X_1+sa_1, Y_1+sb_{b1}, Z_1+sc_1)$ and $(X_2+ta_2, Y_2+tb_2, Z_2+tc_2)$ which are determined by s and t that minimize the above-described J, is a straight line perpendicular to both of the straight lines 1 and 2, in other words, a perpendicular line common to the straight lines 1 and 2.

The image capturing apparatus and the like according to the present disclosure are useful for any multi-lens camera including three lenses or more.

What is claimed is:

1. An image capturing apparatus comprising:
   at least three cameras each of which captures an image;
   a memory storing a camera parameter of each camera; and
   a processing circuit, wherein
   the processing circuit:
   acquires the images and the camera parameters;
   extracts pairs of images from the images;
   calculates, for each of the pairs of images, based on the pairs of images and the camera parameters, position information including information specifying a three-dimensional position of a measurement point with respect to a pair of pixels, one of the pixels being included in one of the pair of images and the other of the pixels being included in the other of the pair of images, and information specifying a position of the one of the pixels in one of the pair of images and a position of the other of the pixels in the other of the pair of images;
   performs, based on the position information and the camera parameters, weighted addition on the information specifying the three-dimensional position of the measurement point in each of the pair of images, with information using an effective baseline length or a viewing angle with respect to the three-dimensional position, of a pair of the cameras corresponding to the pair of images; and
   outputs position information of the measurement point to which a weighted addition value is applied, and
   wherein the processing circuit determines a weight applied to the information specifying the three-dimensional position of the measurement point in each of the pair of images, so that variance of the weighted addition value is minimized.

2. An image capturing apparatus comprising:
   at least three cameras each of which captures an image;
   a memory storing a camera parameter of each camera; and
   a processing circuit, wherein
   the processing circuit:
   acquires the images and the camera parameters;
   extracts pairs of images from the images;
   calculates, for each of the pairs of images, based on the pairs of images and the camera parameters, position information including information specifying a three-dimensional position of a measurement point with respect to a pair of pixels, one of the pixels being included in one of the pair of images and the other of the pixels being included in the other of the pair of images, and information specifying a position of the one of the pixels in one of the pair of images and a position of the other of the pixels in the other of the pair of images;
   performs, based on the position information and the camera parameters, weighted addition on the information specifying the three-dimensional position of the measurement point in each of the pair of images, with information using an effective baseline length or a viewing angle with respect to the three-dimensional position, of a pair of the cameras corresponding to the pair of images; and outputs position information of the measurement point to which a weighted addition value is applied, and wherein in the weighted addition, the processing circuit uses a value obtained by normalizing the effective baseline length to the power of two by the sum of effective baseline lengths to the power of two.

3. An image capturing apparatus comprising:

at least three cameras each of which captures an image;

a memory storing a camera parameter of each camera; and a processing circuit, wherein the processing circuit:
  acquires the images and the camera parameters;
  extracts pairs of images from the images;
  calculates, for each of the pairs of images, based on the pairs of images and the camera parameters, position information including information specifying a three-dimensional position of a measurement point with respect to a pair of pixels, one of the pixels being included in one of the pair of images and the other of the pixels being included in the other of the pair of images, and information specifying a position of the one of the pixels in one of the pair of images and a position of the other of the pixels in the other of the pair of images;
  performs, based on the position information and the camera parameters, weighted addition on the information specifying the three-dimensional position of the measurement point in each of the pair of images, with information using an effective baseline length or a viewing angle with respect to the three-dimensional position, of a pair of the cameras corresponding to the pair of images; and
  outputs position information of the measurement point to which a weighted addition value is applied, and
wherein, in the weighted addition, the processing circuit uses a value obtained by normalizing the viewing angle to the power of two by the sum of viewing angles to the power of two.

4. An image processing method comprising:

(a1) acquiring an image captured by each of at least three cameras;

(a2) acquiring a camera parameter of each camera;

(a3) extracting pairs of images from the images;

(a4) calculating, for each of the pairs of images, based on the pairs of images and camera parameters, position information including information specifying a three-dimensional position of a measurement point with respect to a pair of pixels, one of the pixels being included in one of the pair of images and the other of the pixels being included in the other of the pair of images, and information specifying a position of the one of the pixels in one of the pair of images and a position of the other of the pixels in the other of the pair of images;

(a5) performing, based on the position information and the camera parameters, weighted addition on the information specifying the three-dimensional position of the measurement point in each of the pair of images, with information using an effective baseline length or a viewing angle with respect to the three-dimensional position, of a pair of the cameras corresponding to the pair of images; and (a6) outputting position information of the measurement point to which a weighted addition value is applied, wherein at least one of the processes (a1) to (a6) is executed by a processor, and wherein a weight applied to the information specifying the three-dimensional position of the measurement point in each of the pair of images is determined so that variance of the weighted addition value is minimized.

5. An image processing method comprising:

(a1) acquiring an image captured by each of at least three cameras;

(a2) acquiring a camera parameter of each camera;

(a3) extracting pairs of images from the images;

(a4) calculating, for each of the pairs of images, based on the pairs of images and camera parameters, position information including information specifying a three-dimensional position of a measurement point with respect to a pair of pixels, one of the pixels being included in one of the pair of images and the other of the pixels being included in the other of the pair of images, and information specifying a position of the one of the pixels in one of the pair of images and a position of the other of the pixels in the other of the pair of images;

(a5) performing, based on the position information and the camera parameters, weighted addition on the information specifying the three-dimensional position of the measurement point in each of the pair of images, with information using an effective baseline length or a viewing angle with respect to the three-dimensional position, of a pair of the cameras corresponding to the pair of images; and (a6) outputting position information of the measurement point to which a weighted addition value is applied, wherein at least one of the processes (a1) to (a6) is executed by a processor, and wherein the weighted addition uses a value obtained by normalizing the effective baseline length to the power of two by the sum of effective baseline lengths to the power of two.

6. An image processing method comprising:

(a1) acquiring an image captured by each of at least three cameras;

(a2) acquiring a camera parameter of each camera;

(a3) extracting pairs of images from the images;

(a4) calculating, for each of the pairs of images, based on the pairs of images and camera parameters, position information including information specifying a three-dimensional position of a measurement point with respect to a pair of pixels, one of the pixels being included in one of the pair of images and the other of the pixels being included in the other of the pair of images, and information specifying a position of the one of the pixels in one of the pair of images and a position of the other of the pixels in the other of the pair of images;

(a5) performing, based on the position information and the camera parameters, weighted addition on the information specifying the three-dimensional position of the measurement point in each of the pair of images, with information using an effective baseline length or a viewing angle with respect to the three-dimensional position, of a pair of the cameras corresponding to the pair of images; and (a6) outputting position information of the measurement point to which a weighted addition value is applied, wherein at least one of the processes (a1) to (a6) is executed by a processor, and wherein the weighted addition uses a value obtained by normalizing the viewing angle to the power of two by the sum of viewing angles to the power of two.

7. A non-transitory computer-readable recording medium storing a control program that causes an instrument including a processor to execute processing comprising:
   (a1) acquiring an image captured by each of at least three cameras;
   (a2) acquiring a camera parameter of each camera;
   (a3) extracting pairs of images from the images;
   (a4) calculating, for each of the pairs of images, based on the pairs of images and camera parameters, position information including information specifying a three-dimensional position of a measurement point with respect to a pair of pixels, one of the pixels being included in one of the pair of images and the other of the pixels being included in the other of the pair of images, and information specifying a position of the one of the pixels in one of the pair of images and a position of the other of the pixels in the other of the pair of images;
   (a5) performing, based on the position information and the camera parameters, weighted addition on the information specifying the three-dimensional position of the measurement point in each of the pair of images, with information using an effective baseline length or a viewing angle with respect to the three-dimensional position, of a pair of the cameras corresponding to the pair of images; and
   (a6) outputting position information of the measurement point to which a weighted addition value is applied,
   wherein a weight applied to the information specifying the three-dimensional position of the measurement point in each of the pair of images is determined so that variance of the weighted addition value is minimized.

8. A non-transitory computer-readable recording medium storing a control program that causes an instrument including a processor to execute processing comprising:
   (a1) acquiring an image captured by each of at least three cameras;
   (a2) acquiring a camera parameter of each camera;
   (a3) extracting pairs of images from the images;
   (a4) calculating, for each of the pairs of images, based on the pairs of images and camera parameters, position information including information specifying a three-dimensional position of a measurement point with respect to a pair of pixels, one of the pixels being included in one of the pair of images and the other of the pixels being included in the other of the pair of images, and information specifying a position of the one of the pixels in one of the pair of images and a position of the other of the pixels in the other of the pair of images;
   (a5) performing, based on the position information and the camera parameters, weighted addition on the information specifying the three-dimensional position of the measurement point in each of the pair of images, with information using an effective baseline length or a viewing angle with respect to the three-dimensional position, of a pair of the cameras corresponding to the pair of images; and
   (a6) outputting position information of the measurement point to which a weighted addition value is applied,
   wherein the weighted addition uses a value obtained by normalizing the effective baseline length to the power of two by the sum of effective baseline lengths to the power of two.

9. A non-transitory computer-readable recording medium storing a control program that causes an instrument including a processor to execute processing comprising:
   (a1) acquiring an image captured by each of at least three cameras;
   (a2) acquiring a camera parameter of each camera;
   (a3) extracting pairs of images from the images;
   (a4) calculating, for each of the pairs of images, based on the pairs of images and camera parameters, position information including information specifying a three-dimensional position of a measurement point with respect to a pair of pixels, one of the pixels being included in one of the pair of images and the other of the pixels being included in the other of the pair of images, and information specifying a position of the one of the pixels in one of the pair of images and a position of the other of the pixels in the other of the pair of images;
   (a5) performing, based on the position information and the camera parameters, weighted addition on the information specifying the three-dimensional position of the measurement point in each of the pair of images, with information using an effective baseline length or a viewing angle with respect to the three-dimensional position, of a pair of the cameras corresponding to the pair of images; and
   (a6) outputting position information of the measurement point to which a weighted addition value is applied,
   wherein the weighted addition uses a value obtained by normalizing the viewing angle to the power of two by the sum of viewing angles to the power of two.

* * * * *